United States Patent
Shimizu et al.

[11] Patent Number: 5,851,426
[45] Date of Patent: Dec. 22, 1998

[54] TWISTED NEMATIC LIQUID CRYSTAL COMPOSITION CONTAINING A SILACYCLOHEXANE COMPOUND

[75] Inventors: Takaaki Shimizu; Tatsushi Kaneko; Tsutomu Ogihara; Mutsuo Nakashima, all of Niigata-ken, Japan

[73] Assignee: Shin-Etsu Chemical Co., Ltd., Toyko, Japan

[21] Appl. No.: 873,667

[22] Filed: Jun. 12, 1997

[30] Foreign Application Priority Data

Jun. 17, 1996 [JP] Japan .................................. 8-155399

[51] Int. Cl.⁶ .......................... C09K 19/34; C09K 19/30
[52] U.S. Cl. ................................. 252/299.61; 252/299.63
[58] Field of Search .................... 252/299.01, 299.61, 252/299.63; 428/1

[56] References Cited

U.S. PATENT DOCUMENTS

| | | | |
|---|---|---|---|
| 5,454,977 | 10/1995 | Shimizu et al. | 252/299.61 |
| 5,496,501 | 3/1996 | Shimizu et al. | 252/299.61 |
| 5,730,902 | 3/1998 | Nakashima et al. | 252/299.61 |

FOREIGN PATENT DOCUMENTS

| | | |
|---|---|---|
| 632044 | 1/1995 | European Pat. Off. . |
| 0687678 | 6/1995 | European Pat. Off. . |
| 0761674 | 3/1997 | European Pat. Off. . |
| 6206837 | 7/1992 | Japan . |
| 7242515 | 8/1995 | Japan . |
| 0761674 | 8/1996 | Japan . |

*Primary Examiner*—Shean C. Wu
*Attorney, Agent, or Firm*—McAulay Nissen Goldberg Kiel & Hand, LLP

[57] ABSTRACT

This invention provides twisted nematic liquid crystal compositions obtained by adding a cyclohexane ring-containing optically active compound of the following general formula (1) to a mixture of nematic liquid crystal compounds including at least one silacyclohexane compound, as well as guest-host liquid crystal compositions and liquid crystal display devices utilizing the same.

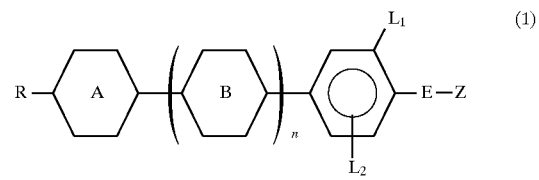

8 Claims, No Drawings

TWISTED NEMATIC LIQUID CRYSTAL COMPOSITION CONTAINING A SILACYCLOHEXANE COMPOUND

BACKGROUND OF THE INVENTION

1. Field of the Invention

This invention relates to twisted nematic liquid crystal compositions containing a silacyclohexane compound and suitable for use in various liquid crystal display devices, as well as uses thereof.

2. Description of the Related Art

Liquid crystal display devices are devices utilizing optical anisotropy and dielectric anisotropy possessed by liquid crystal materials. According to the display mode, there are various types including the TN (twisted nematic), STN (super-twisted nematic), SBE (super-twisted birefringence effect), OMI (optical mode interference), GH (guest-host) and PC (phase change) types.

In order to prevent display defects such as reverse tilt disclination, to impart a twisting force for increasing the angle of twist within the cell, or to impart cholesteric properties required for nematic-cholesteric phase transition, 0.05 to 10% by weight of an optically active substance is added to liquid crystal compositions used for those purposes. As such optically active substances, there have conventionally been known liquid crystal compounds having a cholesteric phase, such as cholesteryl nonanoate, phenyl benzoate, and compounds of the formula

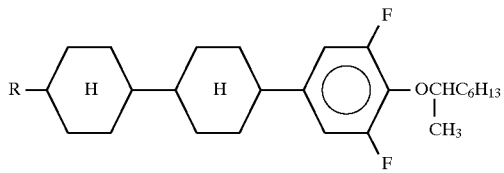

(Japanese Patent Provisional Publication No. 6-206837; R is a substituted or unsubstituted $C_{1-18}$ alkyl or $C_{1-18}$ alkenyl group). Moreover, the present inventors made an invention concerning a novel optically active substance containing a silacyclohexane ring and filed an application for a patent therefor (Japanese Patent Application No. 7-242515.

When such an optically active substance is added to a liquid crystal composition, it is desirable that a desired twisted helical pitch can be achieved by using the optically active substance in as small an amount as possible. The reasons for this are as follows: (1) When an optically active substance contains a functional group having relatively high chemical reactivity (e.g., an ester group) in the chemical structure thereof, the addition of a large amount of the optically active substance detracts from the long-term reliability of the liquid crystal display device. (2) Since many optically active substances have a cholesteric phase, their addition to nematic liquid crystal compositions causes an increase in viscosity i.e., a decrease in response speed even if they are used in relatively small amounts. (3) Optically active substances are expensive as compared with nematic liquid crystal compositions.

The twisting power of an optically active substance is evaluated by the product of the concentration [C (% by weight)] of the optically active substance added and the cholesteric helical pitch [P ($\mu$m)] induced thereby. That is, as the PC product of an optically active substance becomes smaller, a short cholesteric helical pitch can be induced by adding it in a smaller amount. It is also known that, even if an identical optically active substance is used, the value of P may vary according to the type of the nematic liquid crystal composition to which it is added.

SUMMARY OF THE INVENTION

Accordingly, it is an object of the present invention to provide twisted nematic compositions comprising a nematic liquid crystal composition and an optically active substance which, when added to the liquid crystal composition in a relatively small amount, can impart a desired twisted helical pitch thereto.

As a result of intensive investigations, the present inventors have found that a particularly small value of the PC product can be achieved when a silacyclohexane ring-containing optically active substance as disclosed in the above application (Japanese Patent Application No. 7-242515 is added to a liquid crystal composition containing at least one liquid crystal compounds having a silacyclohexane ring in the molecular structure.

The present invention is particularly effective in display modes requiring a short twisted helical pitch (i.e., requiring the addition of a relatively large amount of an optically active substance), such as the STN, SBE, OMI, PC and PCGH (phase change guest-host) modes.

A twisted nematic liquid crystal composition in accordance with the present invention comprises a mixture of (a) a silacyclohexane ring-containing optically active compound of the general formula (1) given below and (b) a nematic liquid crystal composition comprising one or more compounds selected from the group consisting of the compounds of the general formulae (2) to (7) given below, at least one of the compounds being a compound containing a trans-1-sila-1,4-cyclohexylene or trans-4-sila-1,4-cyclohexylene group.

The silacyclohexane ring-containing optically active compound used in the present invention can be represented by the following general formula (1).

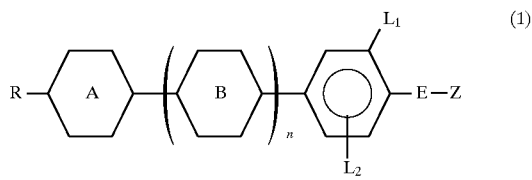

wherein R is a linear $C_{1-10}$ alkyl group, a branched $C_{3-8}$ alkyl group, a $C_{2-7}$ alkoxyalkyl group, a $C_{1-10}$ mono- or difluoroalkyl group, or a $C_{2-8}$ alkenyl group,

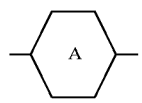

is a trans-1-sila-1,4-cyclohexylene or trans-4-sila-1,4-cyclohexylene group in which the silicon atom at the 1- or 4-position has a substituent comprising H, F, Cl or $CH_3$, or is a 1,4-cyclohexylene group,

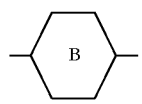

is a trans-1-sila-1,4-cyclohexylene or trans-4-sila-1,4-cyclohexylene group in which the silicon atom at the 1- or 4-position has a substituent comprising H, F, Cl or CH₃, or is a 1,4-cyclohexylene or 1,4-phenylene group, n is 0 or 1, E is —CH₂— or —O—, Z is a chiral group containing one or more chiral carbon atoms, and $L_1$ and $L_2$ are each independently H or F, this silacyclohexane compound of the general formula (1) containing at least one trans-1-sila-1,4-cyclohexylene or trans-4-sila-1,4-cyclohexylene group.

The nematic liquid crystal composition used in the present invention comprises one or more compounds selected from the group consisting of the compounds of the general formulae (2) to (7)

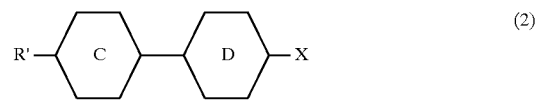   (2)

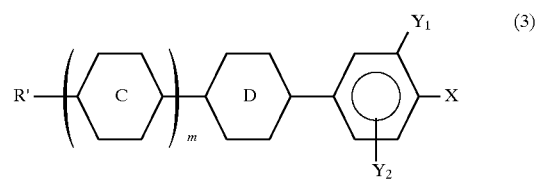   (3)

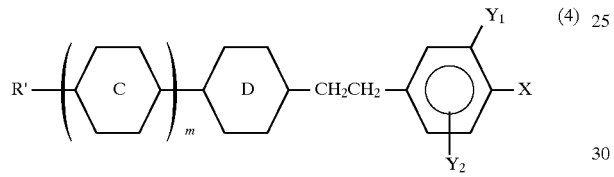   (4)

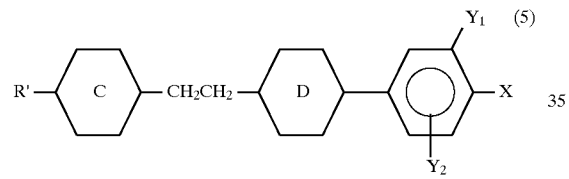   (5)

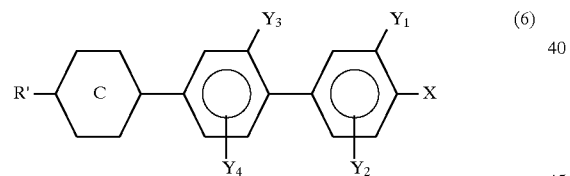   (6)

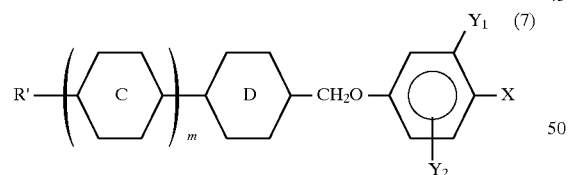   (7)

wherein R' is a $C_{1-7}$ alkyl group, a $C_{2-7}$ alkoxyalkyl group, a $C_{2-7}$ mono- or difluoroalkyl group, or a $C_{2-7}$ alkenyl group, m is 0 or 1,

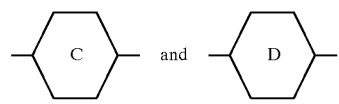

are each independently a trans-1-sila-1,4-cyclohexylene, trans-4-sila-1,4-cyclohexylene or trans-1,4-cyclohexylene group, X is H, CN, F, Cl, OCHF₂, OCF₃, CF₃, $OC_kH_{2k+1}$ (wherein k is an integer of 1 to 5), $C_kH_{2k+1}$, $(O)_sC_pH_qF_r$ [wherein p is 2, 3 or 4, q and r are such integers that (q+r) is equal to (2p+1), and s is 0 or 1] or $(O)_sCY=CX_1X_2$ [wherein $X_1$ and Y are each H, F or Cl, $X_2$ is F or Cl, and s is 0 or 1], and p1 $Y_1$, $Y_2$, $Y_3$ and $Y_4$ are each independently H or F, at least one of the compounds being a compound containing a trans-1-sila-1,4-cyclohexylene or trans-4-sila-1,4-cyclohexylene group.

In another embodiment of the present invention, the twisted nematic liquid crystal composition further comprises, in addition to the nematic liquid crystal composition described above in connection with the general formulae (2) to (7), one or more compounds selected from the group consisting of the compounds of the general formulae (8) to (11)

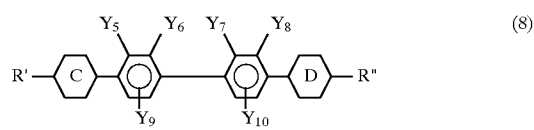   (8)

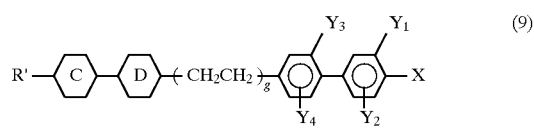   (9)

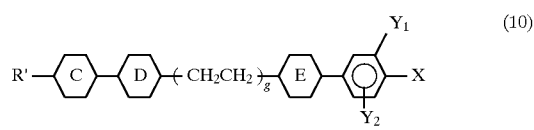   (10)

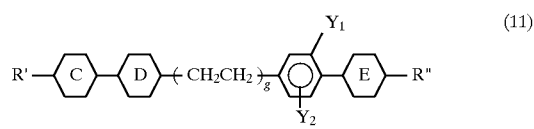   (11)

wherein R' and X are as defined for the above general formulae (2) to (7), g is 0 or 1,

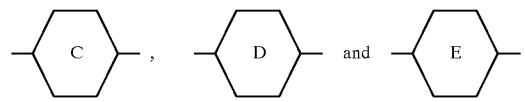

are each independently a trans-1-sila-1,4-cyclohexylene, trans-4-sila-1,4-cyclohexylene or trans-1,4-cyclohexylene group, R" is as defined for R', but is independent of R', and $Y_1$ to $Y_{10}$ are each independently H or F.

Moreover, the present invention also relates to guest-host liquid crystal compositions obtained by adding a dichromatic dye to a twisted nematic liquid crystal composition as described above, and to liquid crystal display devices containing these various compositions.

The optically active compound of the present invention is added to nematic liquid crystal compositions containing at least one silacyclohexane compound for the purpose of preventing display defects, imparting a twisting force thereto, or imparting cholesteric properties thereto. Since the optically active compound of the present invention may be used in small amounts, the resulting liquid crystal panels are excellent from the viewpoint of long-term reliability, response speed and cost.

Specifically, when the optically active silacyclohexane compound is added to liquid crystal compositions containing at least one silacyclohexane compound, uniquely small PC products (P, twisted helical pitch; C, concentration) are obtained. Thus, the desired purpose can be achieved by adding the optically active silacyclohexane compound in small amounts.

The twisted nematic liquid crystal compositions of the present invention can be applied to liquid crystal display devices in various display modes requiring a chiral dopant, such as the TN, STN and GH modes. In particular, they are highly effective, for example, in the PCGH and PC modes which require a large amount of a chiral dopant (i.e., a short twisted helical pitch).

DETAILED DESCRIPTION OF THE PREFERRED EMBODIMENTS

The silacyclohexane compounds represented by the above general formula (1) and the compounds represented by the above general formulae (2) to (7) and the above general formulae (8) to (11) are more specifically described hereinbelow.

Specifically, the compounds of the general formula (1) include silacyclohexane compounds having the following ring structures containing at least one trans-1- or trans-4-silacyclohexane ring.

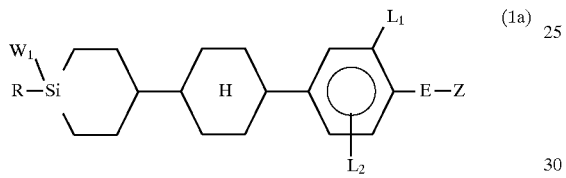

(1a)

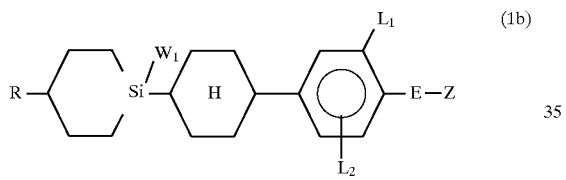

(1b)

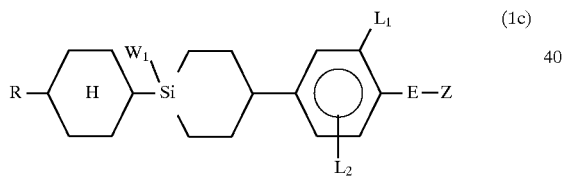

(1c)

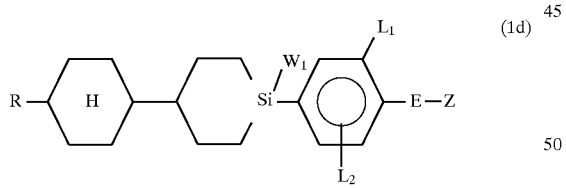

(1d)

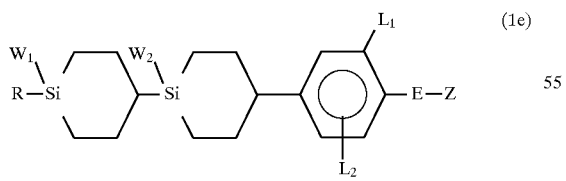

(1e)

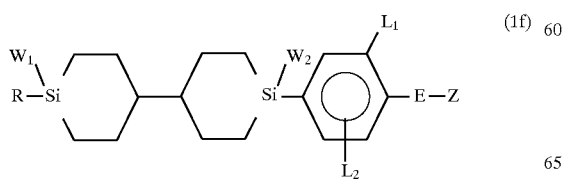

(1f)

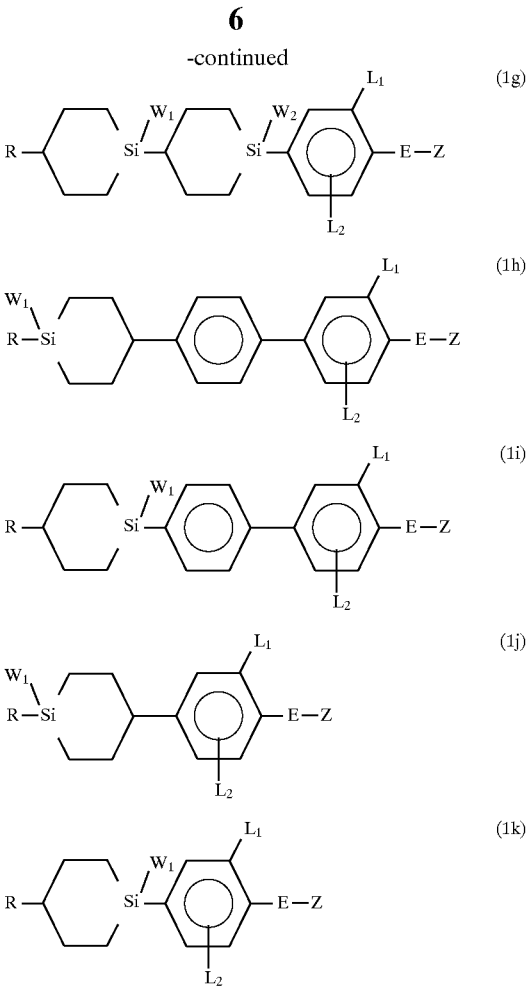

(1g)

(1h)

(1i)

(1j)

(1k)

In the above formulae, R represents any of the following groups:

(a) Linear $C_{1-10}$ alkyl groups, including methyl, ethyl, n-propyl, n-butyl, n-pentyl, n-hexyl, n-heptyl, n-octyl, n-nonyl and n-decyl group.

(b) Branched $C_{3-8}$ alkyl groups, including isopropyl, sec-butyl, isobutyl, 1-methylbutyl, 2-methylbutyl, 3-methylbutyl, 1-methylpentyl, 2-methylpentyl, 3-methylpentyl, 1-ethylpentyl, 1-methylhexyl, 2-methylhexyl, 3-methylhexyl, 2-ethylhexyl, 3-ethylhexyl, 1-methylheptyl, 2-methylheptyl and 3-methylheptyl group.

(c) $C_{2-7}$ alkoxyalkyl groups, including methoxymethyl, ethoxymethyl, propoxymethyl, butoxymethyl, pentoxymethyl, hexyloxymethyl, methoxyethyl, ethoxyethyl, propoxyethyl, butoxyethyl, methoxypropyl, ethoxypropyl, propoxypropyl, butoxypropyl, methoxybutyl, ethoxybutyl, propoxybutyl, methoxypentyl, ethoxypentyl and methoxyhexyl group.

(d) $C_{1-10}$ Mono- and difluoroalkyl groups, including fluoromethyl, 1-fluoroethyl, 1-fluoropropyl, 1-fluorobutyl, 1-fluoropentyl, 1-fluorohexyl, 1-fluoroheptyl, 1-fluorooctyl, 1-fluorononyl, 1-fluorodecyl, 2-fluoroethyl, 2-fluoropropyl, 2-fluorobutyl, 2-fluoropentyl, 2-fluorohexyl, 2-fluoroheptyl, 2-fluorooctyl, 2-fluorononyl, 2-fluorodecyl, 3-fluoropropyl, 3-fluorobutyl, 3-fluoropentyl, 3-fluorohexyl, 3-fluoroheptyl, 3-fluorooctyl, 3-fluorononyl, 3-fluorodecyl, 4-fluorobutyl, 4-fluoropentyl, 4-fluorohexyl, 4-fluoroheptyl, 4-fluorooctyl, 4-fluorononyl, 4-fluorodecyl, 5-fluoropentyl, 5-fluorohexyl, 5-fluoroheptyl, 5-fluorooctyl, 5-fluorononyl, 5-fluorodecyl, 6-fluorohexyl, 6-fluoroheptyl, 6-fluorooctyl, 6-fluorononyl, 6-fluorodecyl, 7-fluoroheptyl, 7-fluorooctyl, 7-fluorononyl, 7-fluorodecyl, 8-fluorooctyl, 8-fluorononyl, 8-fluorodecyl, 9-fluorononyl, 9-fluorodecyl, 10-fluorodecyl, difluoromethyl, 1,1-difluoroethyl, 1,1-difluoropropyl, 1,1-difluorobutyl, 1,1-difluoropentyl, 1,1-difluorohexyl, 1,1-difluoroheptyl, 1,1-difluorooctyl, 1,1-difluorononyl, 1,1-difluorodecyl, 2,2-difluoroethyl, 2,2-difluoropropyl, 2,2-difluorobutyl, 2,2-difluoropentyl, 2,2-difluorohexyl, 2,2-difluoroheptyl, 2,2-difluorooctyl, 2,2-difluorononyl, 2,2-difluorodecyl, 3,3-difluoropropyl, 3,3-difluorobutyl, 3,3-difluoropentyl, 3,3-difluorohexyl, 3,3-difluoroheptyl, 3,3-difluorooctyl, 3,3-difluorononyl, 3,3-difluorodecyl, 4,4-difluorobutyl, 4,4-difluoropentyl, 4,4-difluorohexyl, 4,4-difluoroheptyl, 4,4-difluorooctyl, 4,4-difluorononyl, 4,4-difluorodecyl, 5,5-difluoropentyl, 5,5-difluorohexyl, 5,5-difluoroheptyl, 5,5-difluorooctyl, 5,5-difluorononyl, 5,5-difluorodecyl, 6,6-difluorohexyl, 6,6-difluoroheptyl, 6,6-difluorooctyl, 6,6-difluorononyl, 6,6-difluorodecyl, 7,7-difluoroheptyl, 7,7-difluorooctyl, 7,7-difluorononyl, 7,7-difluorodecyl, 8,8-difluorooctyl, 8,8-difluorononyl, 8,8-difluorodecyl, 9,9difluorononyl, 9,9-difluorodecyl and 10,10-difluorodecyl group.

(e) $C_{2-8}$ alkenyl groups, including vinyl, 1-propenyl, allyl, 1-butenyl, 3-butenyl, isoprenyl, 1-pentenyl, 3-pentenyl, 4-pentenyl, dimethylallyl, 1-hexenyl, 3-hexenyl, 5-hexenyl, 1-heptenyl, 3-heptenyl, 6-heptenyl and 7-octenyl group.

$W_1$ and $W_2$ are each independently H, F, Cl or $CH_3$. E is —$CH_2$— or —O—. $L_1$ and $L_2$ are each independently H or F. Z is a chiral group containing one or more chiral carbon atoms, that is, Z is any of the groups represented by the following general formulae (12a) to (12c).

$$—(CH_2)_a—C^*R_0G—C_bH_{2b+1} \qquad (12a)$$

wherein a is an integer of 0 to 8, b is an integer of 2 to 14, $R_0$ is hydrogen or a linear $C_{1-6}$ alkyl group, G is $CH_3$, halogen (i.e., Cl, Br, F or I), $CF_3$, $CHF_2$, $CH_2F$ or CN, and C* is a chiral carbon atom having four different substituents, so that the three substituents, $R_0$, G and —$C_bH_{2b+1}$ are different from each other.

$$—(CH_2)_c—CHF—(CH_2)_d—CHF—C_eH_{2e+1} \qquad (12b)$$

wherein c is an integer of 0 to 8, d is an integer of 0 to 6, and e is an integer of 1 to 10.

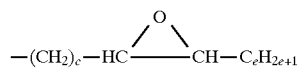

wherein c and e are as defined for the general formula (12b).

Among the foregoing chemical formulae, preferred examples of the ring structure of the compounds of the general formula (1) are those represented by chemical formulae (1a), (1c), (1e), (1h) and (1j).

Preferred examples of R are as follows:

(f) Linear $C_{2-7}$ alkyl groups, including ethyl, n-propyl, n-butyl, n-pentyl, n-hexyl and n-heptyl group.

(g) Branched $C_{3-8}$ alkyl groups, including isopropyl, sec-butyl, isobutyl, 1-methylbutyl, 2-methylbutyl, 3-methylbutyl, 1-methylpentyl, 2-methylpentyl and 2-ethylhexyl group.

(h) $C_{2-6}$ alkoxyalkyl groups, including methoxymethyl, ethoxymethyl, propoxymethyl, pentoxymethyl, methoxyethyl, ethoxyethyl, methoxypropyl and methoxypentyl group.

(i) $C_{2-7}$ mono- and difluoroalkyl groups, including 2-fluoroethyl, 2-fluoropropyl, 2-fluorobutyl, 2-fluoropentyl, 2-fluorohexyl, 2-fluoroheptyl, 4-fluorobutyl, 4-fluoropentyl, 4-fluorohexyl, 4-fluoroheptyl, 5-fluoropentyl, 5-fluorohexyl, 5-fluoroheptyl, 6-fluorohexyl, 6-fluoroheptyl, 7-fluoroheptyl, 2,2-difluoroethyl, 2,2-difluoropropyl, 2,2-difluorobutyl, 2,2-difluoropentyl, 2,2-difluorohexyl, 2,2-difluoroheptyl, 4,4-difluorobutyl, 4,4-difluoropentyl, 4,4-difluorohexyl, 4,4-difluoroheptyl, 5,5-difluoropentyl, 5,5-difluorohexyl, 5,5-difluoroheptyl, 6,6-difluorohexyl, 6,6-difluoroheptyl and 7,7-difluoroheptyl group.

(j) $C_{2-8}$ alkenyl groups, including vinyl, 1-propenyl, 3-butenyl, 1-pentenyl, 3-pentenyl, 4-pentenyl, 1-hexenyl, 5-hexenyl, 6-heptenyl and 7-octenyl group.

Preferred examples of $W_1$ and $W_2$ are H, F and $CH_3$. Preferred examples of Z are the groups of the general formula (12a) in which a is an integer of 0 to 2, b is an integer of 2 to 10, and $R_0$ is hydrogen, G is $CH_3$, F or CN, and the groups of the general formula (12b) or (12c).

Specific examples of the partial skeleton structure

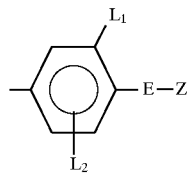

are as follows:

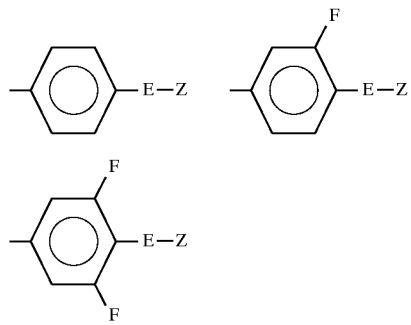

Among these examples, the one given on the right-hand side is preferred.

Specific chemical structures represented by the compounds of the general formula (2) are as follows:

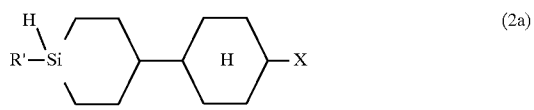
(2a)

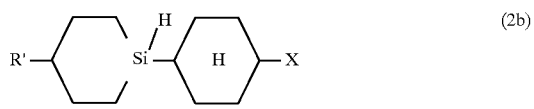
(2b)

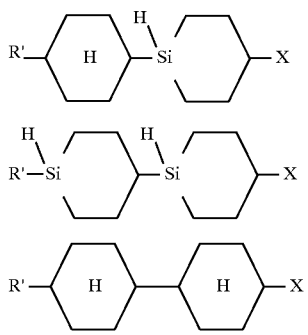

(2c)

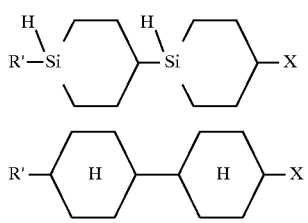

(2d)

(2e)

In the above formulae, R' represents any of the following groups:

(a) $C_{1-7}$ alkyl groups, including methyl, ethyl, n-propyl, n-butyl, n-pentyl, n-hexyl and n-heptyl group.

(b) $C_{2-7}$ alkoxyalkyl groups, including methoxymethyl, 2-methoxyethyl, 3-methoxypropyl, 4-methoxybutyl, 5-methoxypentyl, 6-methoxyhexyl, ethoxymethyl, 2-ethoxyethyl, 3-ethoxypropyl, 4-ethoxybutyl, 5-ethoxypentyl, (n-propoxy)methyl, 2-(n-propoxy)ethyl, 3-(n-propoxy)propyl, 4-(n-propoxy)butyl, (n-butoxy)methyl, 2-(n-butoxy)ethyl, 3-(n-butoxy)propyl, (n-pentoxy)methyl, 2-(n-pentoxy)ethyl and (n-hexyloxy)methyl group.

(c) $C_{2-7}$ mono- and difluoroalkyl groups, including 1-fluoroethyl, 1-fluoropropyl, 1-fluorobutyl, 1-fluoropentyl, 1-fluorohexyl, 1-fluoroheptyl, 2-fluoroethyl, 2-fluoropropyl, 2-fluorobutyl, 2-fluoropentyl, 2-fluorohexyl, 2-fluoroheptyl, 3-fluoropropyl, 3-fluorobutyl, 3-fluoropentyl, 3-fluorohexyl, 3-fluoroheptyl, 4-fluorobutyl, 4-fluoropentyl, 4-fluorohexyl, 4-fluoroheptyl, 5-fluoropentyl, 5-fluorohexyl, 5-fluoroheptyl, 6-fluorohexyl, 6-fluoroheptyl, 7-fluoroheptyl, 1,1-difluoroethyl, 1,1-difluoropropyl, 1,1-difluorobutyl, 1,1-difluoropentyl, 2,2-difluoroethyl, 2,2-difluoropropyl, 2,2-difluorobutyl, 2,2-difluoropentyl, 3,3-difluoropropyl, 3,3-difluorobutyl, 3,3-difluoropentyl, 4,4-difluorobutyl, 4,4-difluoropentyl and 5,5-difluoropentyl group.

(d) $C_{2-7}$ alkenyl groups, including vinyl, 1E-propenyl, 1E-butenyl, 1E-pentenyl, 1E-hexenyl, 1E-heptenyl, 3-butenyl, 3E-pentenyl, 3E-hexenyl, 3E-heptenyl, 4-pentenyl, 4E-hexenyl, 4Z-hexenyl, 4E-heptenyl, 4Z-heptenyl, 5-hexenyl, 5E-heptenyl, 5Z-heptenyl and 6-heptenyl group.

X is H, CN, F, Cl, $OCHF_2$, $OCF_3$, $CF_3$, $C_kH_{2k+1}$ (wherein $1 \leq k \leq 5$), $OC_kH_{2k+1}$, $(O)_sC_pH_qF_r$ (i.e., $CH_2CH_2F$, $CH_2CHF_2$, $CH_2CF_3$, $CH_2CH_2CF_3$, $CF_2CHFCF_3$, $OCH_2CH_2F$, $OCH_2CHF_2$, $OCH_2CF_3$, $OCH_2CH_2CHF_2$, $OCH_2CH_2CF_3$, $OCH_2CF_2CHF_2$, $OCH_2CF_2CF_3$, $OCF_2CHFCF_3$ or $OCF_2CF_3$) or $(O)_sCY=CX_1X_2$ (i.e., $CH=CF_2$, $OCH=CF_2$, $CF=CFH$, $OCF=CFH$, $CF=CF_2$, $OCF=CF_2$, $CF=CHCl$, $CF=CCl_2$, $CCl=CHCl$ or $CH=CCl_2$).

The steric configurations of the silacyclohexane ring and the cyclohexane ring are both in trans form.

Next, specific chemical structures represented by the compounds of the general formula (3) are as follows. In the following formulae, R' and X are as defined for the general formula (2), and $Y_1$ and $Y_2$ are each H or F.

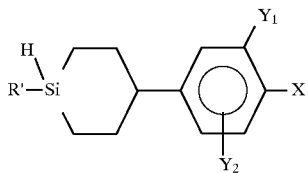

(3a)

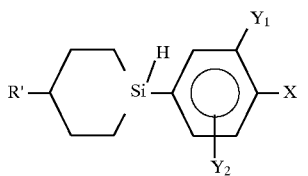

(3b)

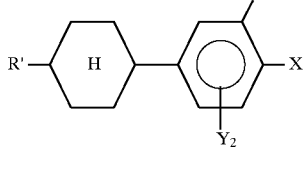

(3c)

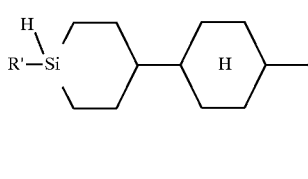

(3d)

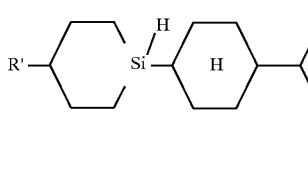

(3e)

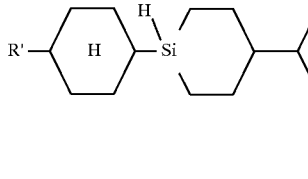

(3f)

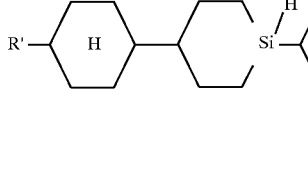

(3g)

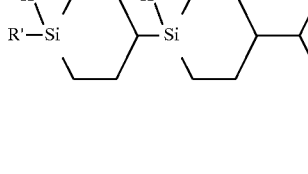

(3h)

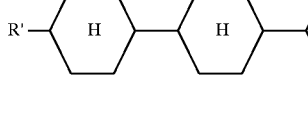

(3i)

The steric configurations of the silacyclohexane ring and the cyclohexane ring are both in trans form.

Specific examples of the partial skeleton structure
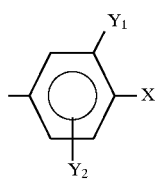
are as follows:
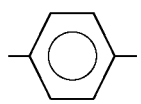 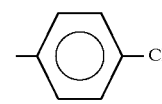 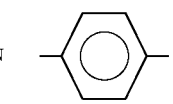
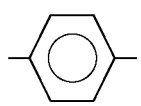 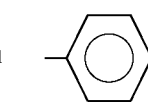
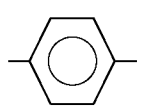 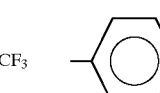
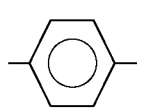 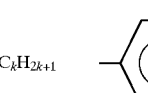
(1 ≦ k ≦ 5)
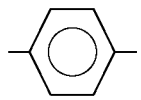 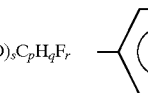
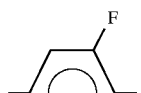 
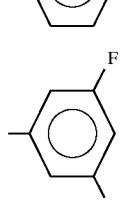 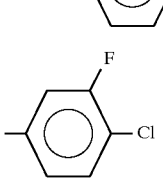
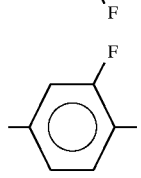 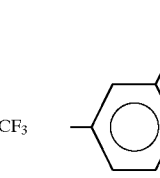
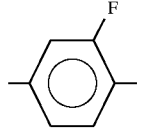
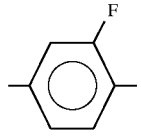 
-continued
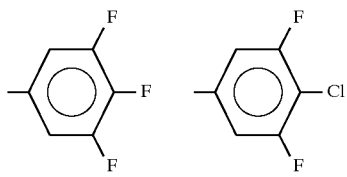
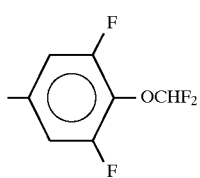 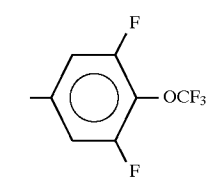
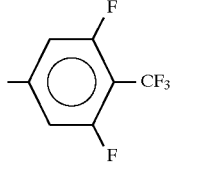 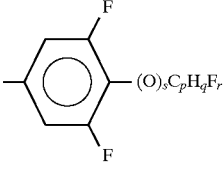
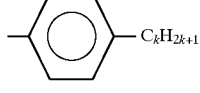 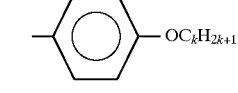
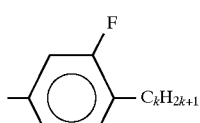 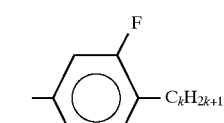
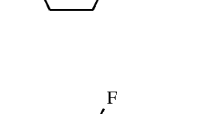 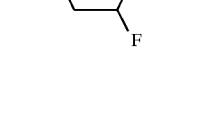
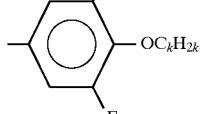 
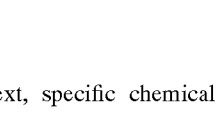
Next, specific chemical structures represented by the compounds of the general formula (4) are as follows:
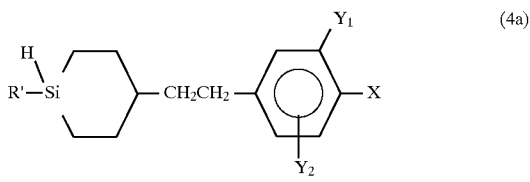
(4a)

-continued

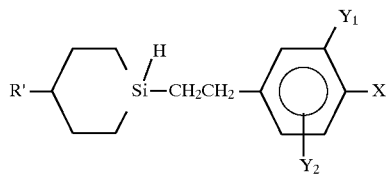 (4b)

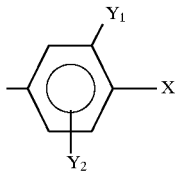

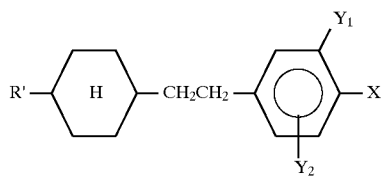 (4c)

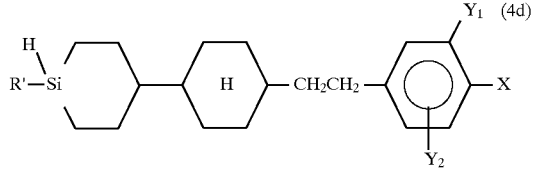 (4d)

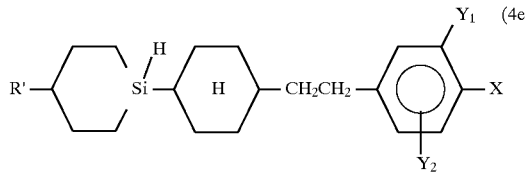 (4e)

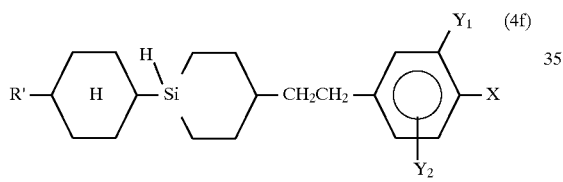 (4f)

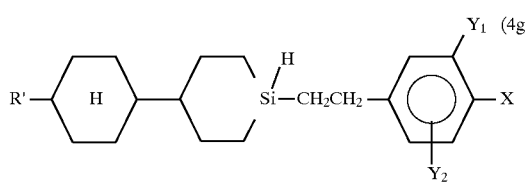 (4g)

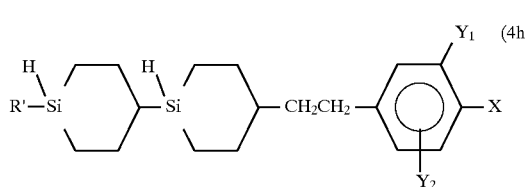 (4h)

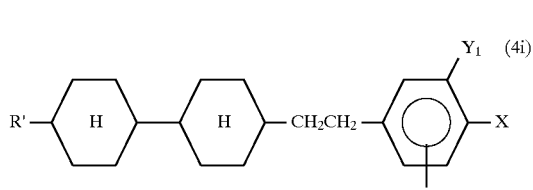 (4i)

In the above formulae, R', $X_1$, $Y_1$, $Y_2$, the steric configurations of the rings, and the partial skeleton structure are as defined for the compounds of the general formula (3).

Next, specific chemical structures represented by the compounds of the general formula (5) are as follows:

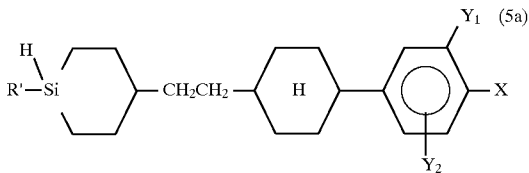 (5a)

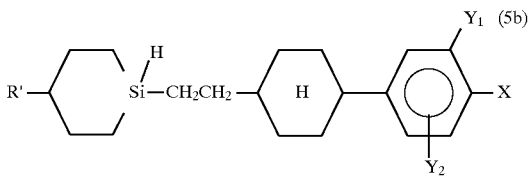 (5b)

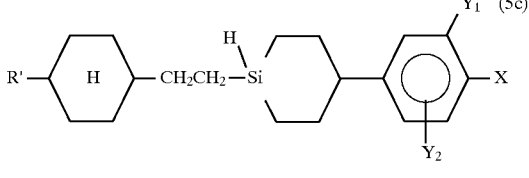 (5c)

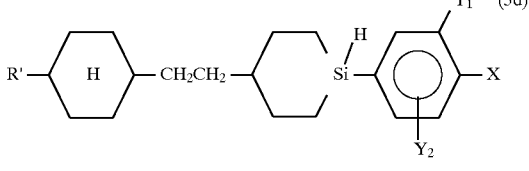 (5d)

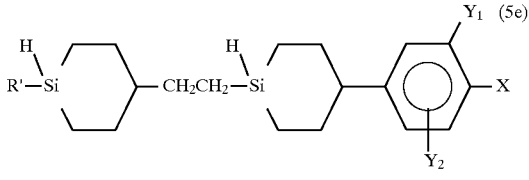 (5e)

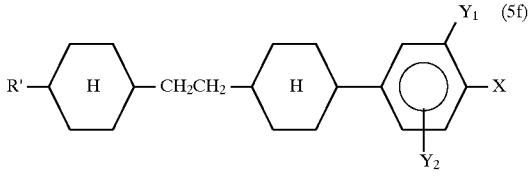 (5f)

In the above formulae, R', $X_1$, $Y_1$, $Y_2$, the steric configurations of the rings, and the partial skeleton structure

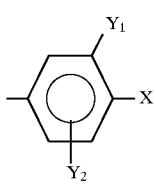

are as defined for the compounds of the general formula (3).

Next, specific chemical structures possessed by the compounds of the general formula (6) are as follows:
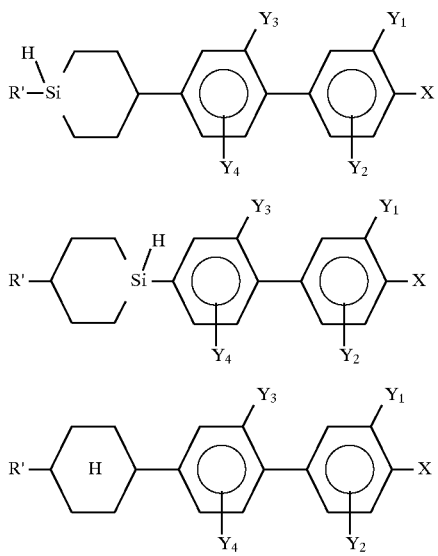
In the above formulae, R', X and the steric configurations of the rings are as defined for the compounds of the general formula (3). $Y_1$, $Y_2$, $Y_3$ and $Y_4$ are each H or F.
Specific examples of the partial skeleton structure
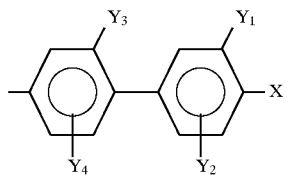
are as follows:
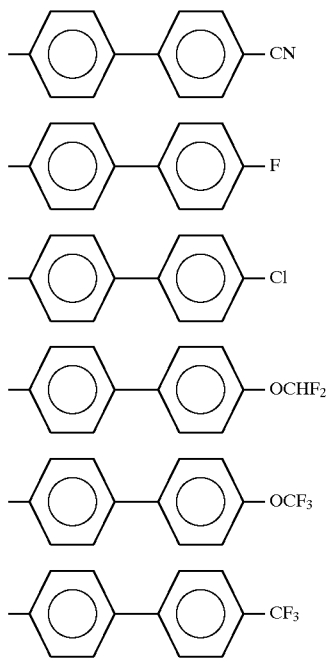
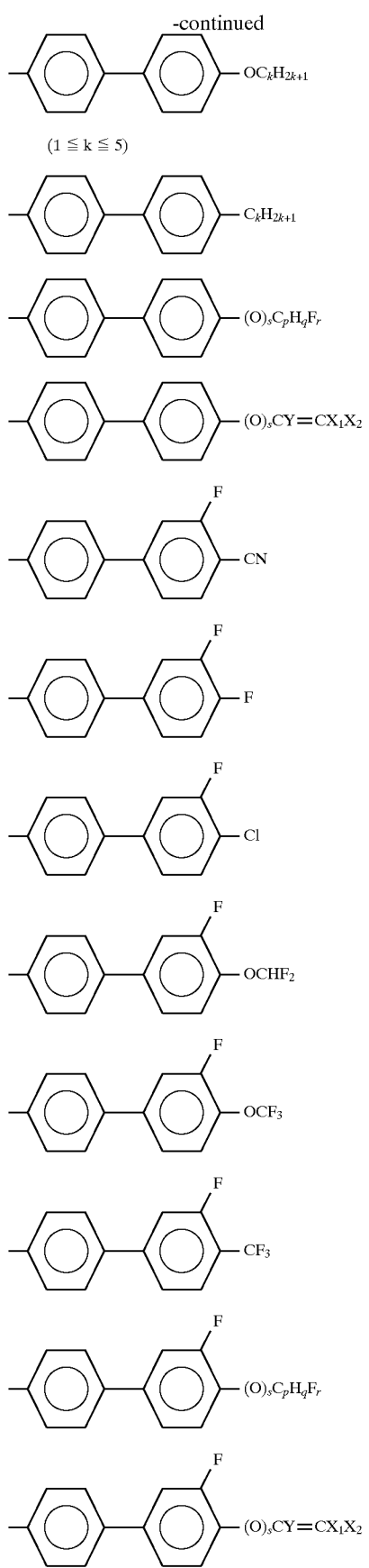
$(1 \leq k \leq 5)$

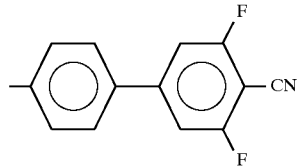
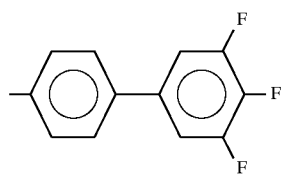
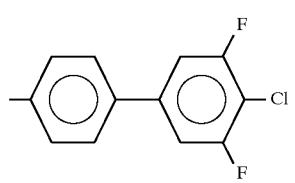
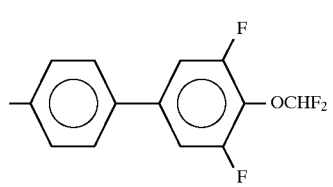
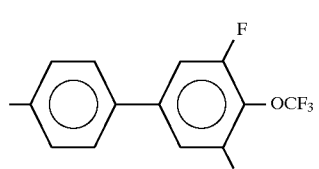
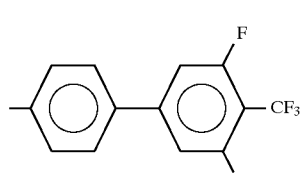
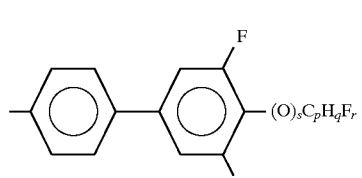
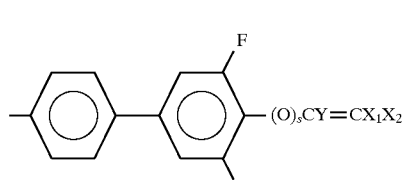
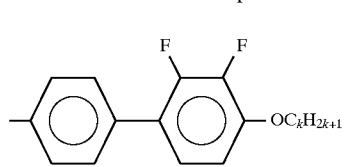
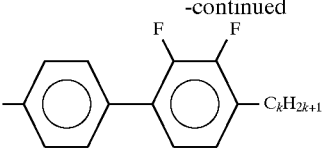
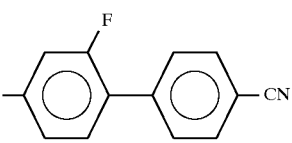
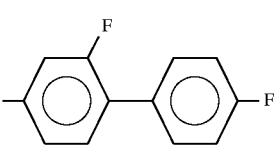
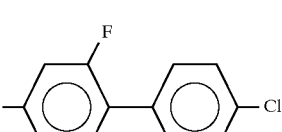
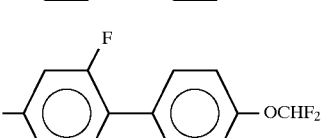
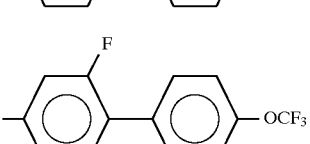
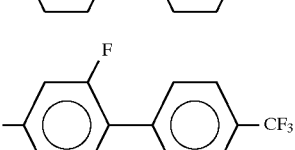
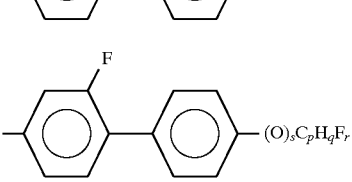
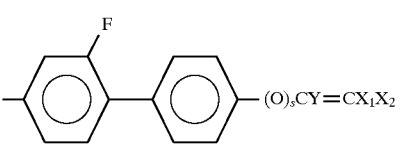
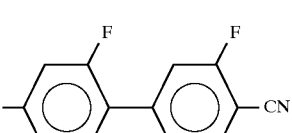
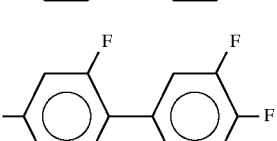

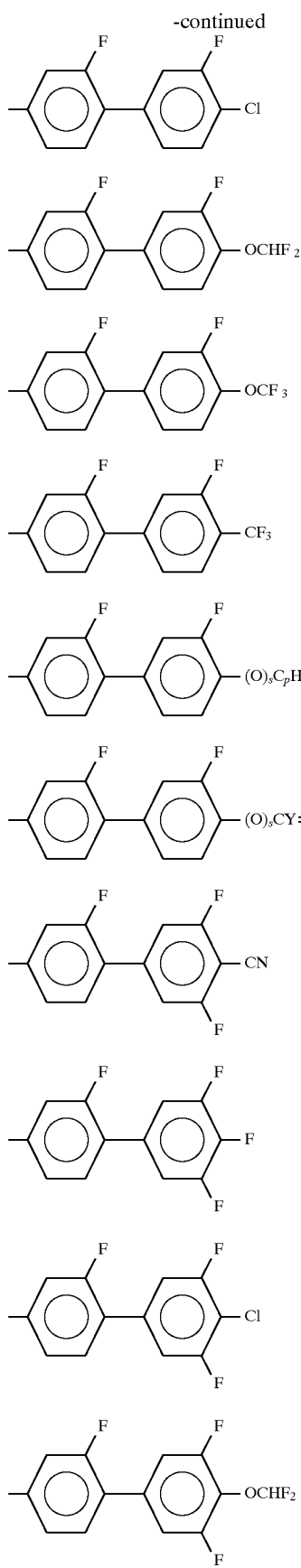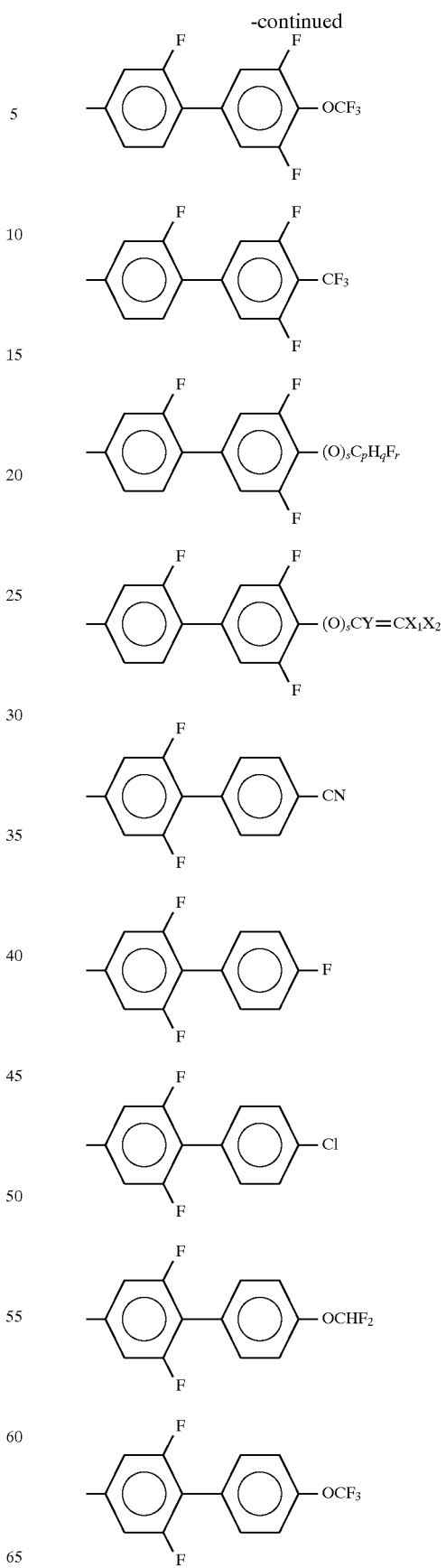

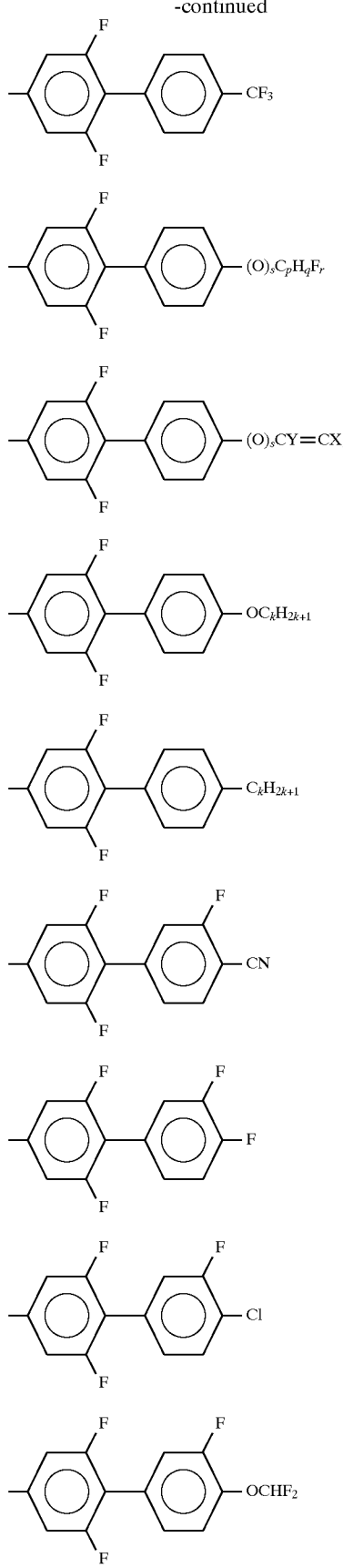

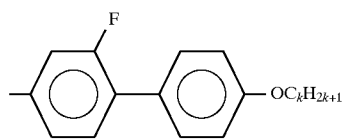
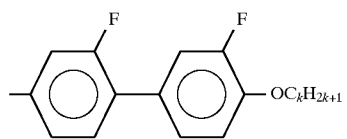
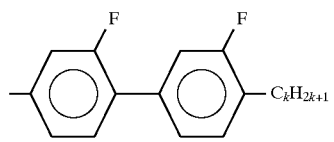
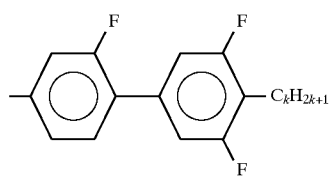
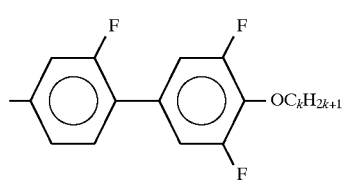
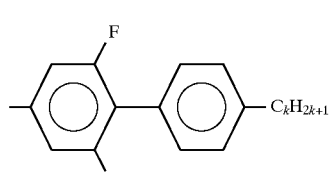
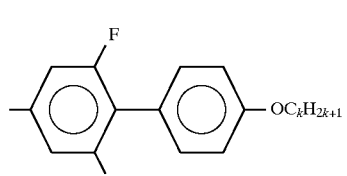
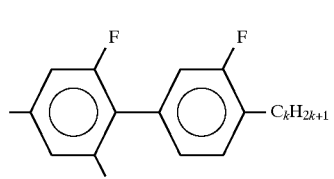
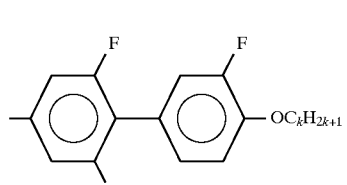
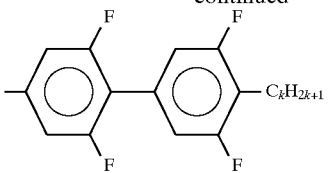
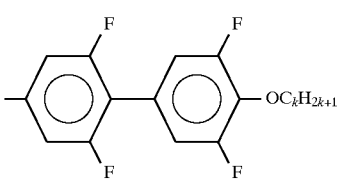
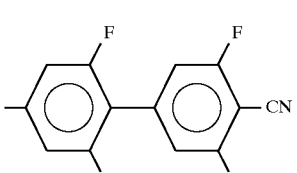
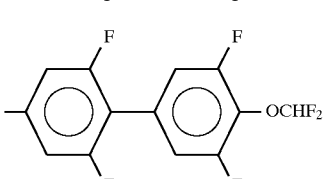
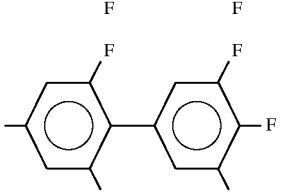
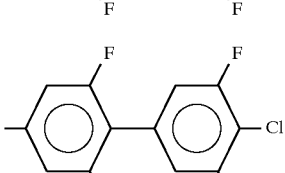
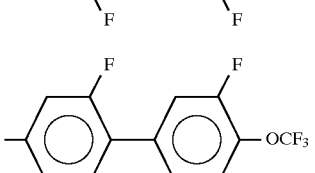
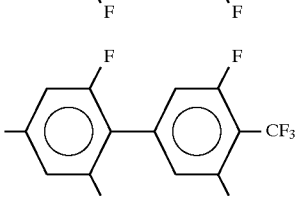
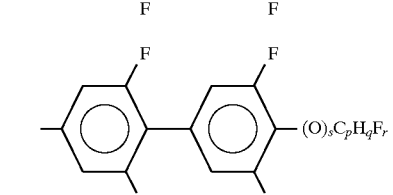

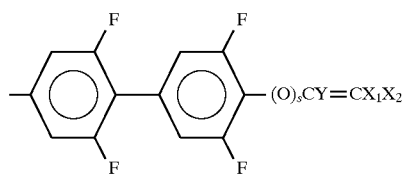 (structure with F substituents) —(O)ₛCY=CX₁X₂

Next, specific chemical structures represented by the compounds of the general formula (7) are as follows:

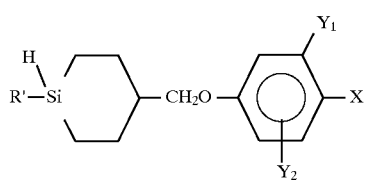 (7a)

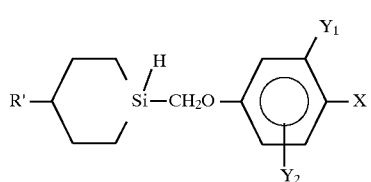 (7b)

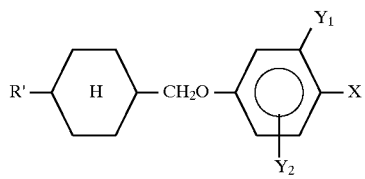 (7c)

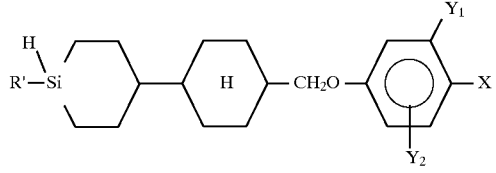 (7d)

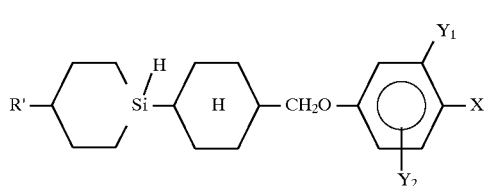 (7e)

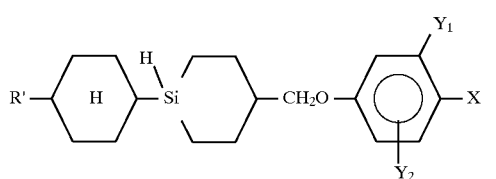 (7f)

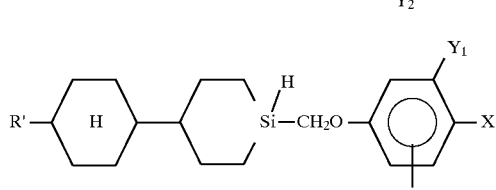 (7g)

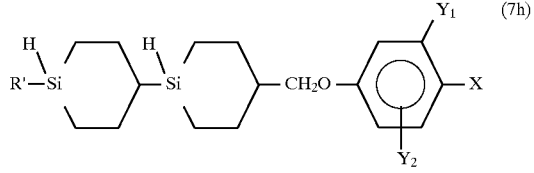 (7h)

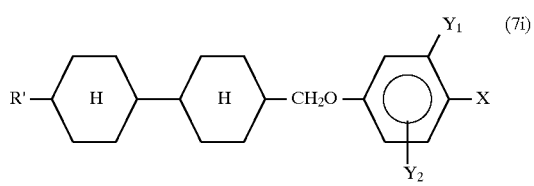 (7i)

In the above formulae, R', $X_1$, $Y_1$, $Y_2$, the steric configurations of the rings, and the partial skeleton structure

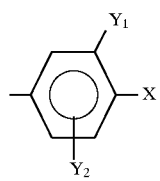

are as defined for the compounds of the general formula (3).

Next, specific chemical structures represented by the compounds of the general formula (8) are as follows:

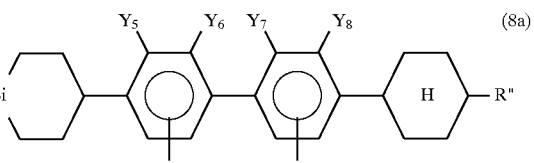 (8a)

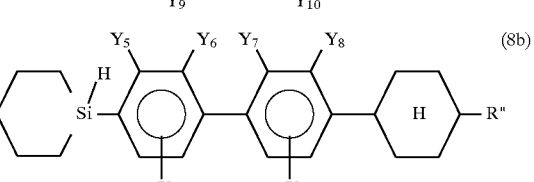 (8b)

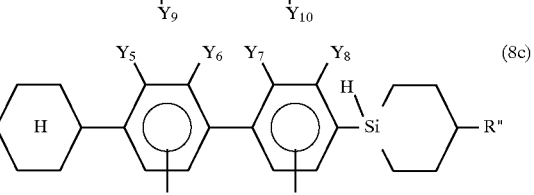 (8c)

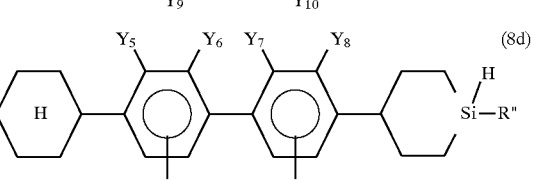 (8d)

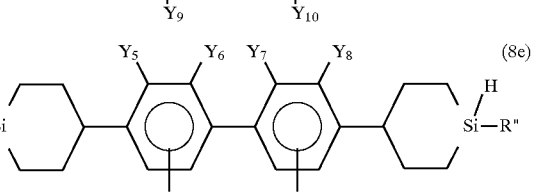 (8e)

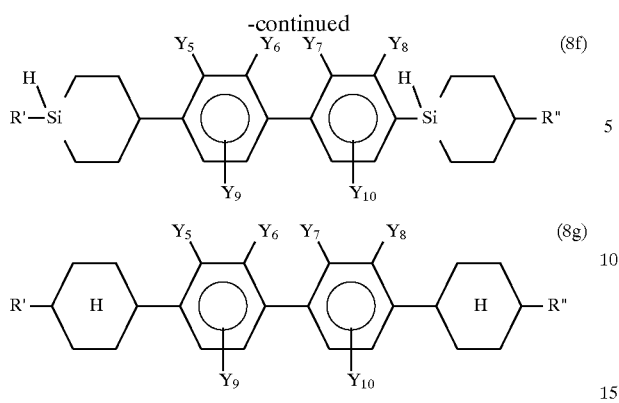 (8f)

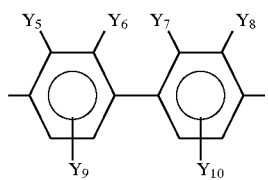 (8g)

In the above formulae, R' and the steric configurations of the rings are as defined for the compounds of the general formulae (2) and (3). R" is as defined for R', but is independent of R'. $Y_5$ to $Y_{10}$ are each H or F.

Specific examples of the partial skeleton structure

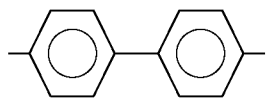

are as follows:

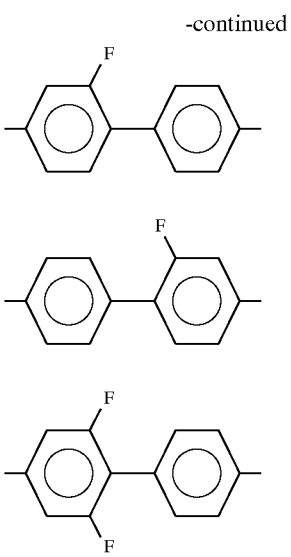

Next, specific chemical structures represented by the compounds of the general formula (9) are as follows:

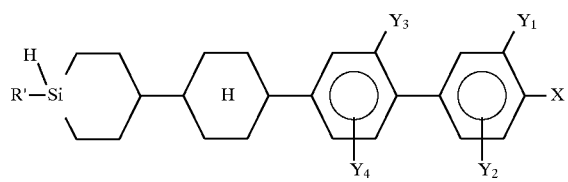 (9a)

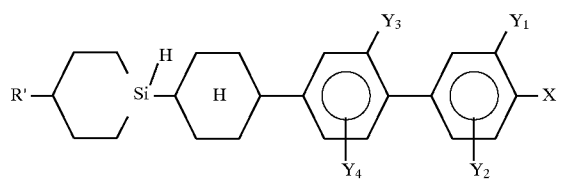 (9b)

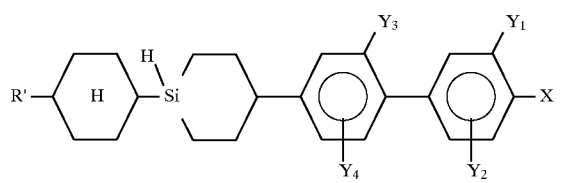 (9c)

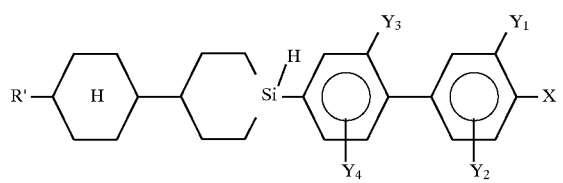 (9d)

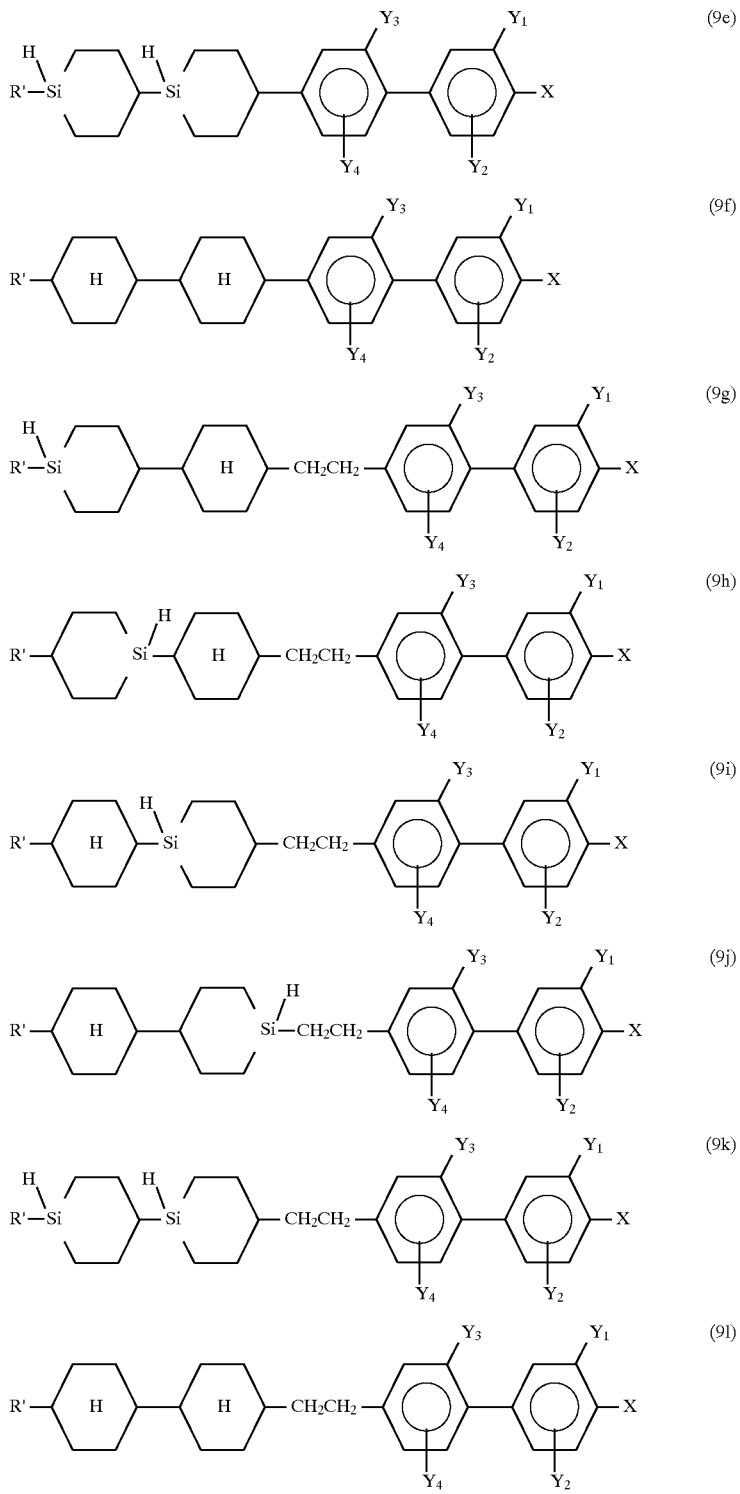
In the above formulae, R', $X_1$ and the steric configurations of the rings are as defined for the compounds of the general formula (3). $Y_1$, $Y_2$, $Y_3$ and $Y_4$ are each H or F. The partial skeleton structure

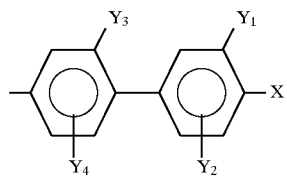
is as defined for the compounds of the general formula (6).
Next, specific chemical structures represented by the compounds of the general formula (10) are as follows:
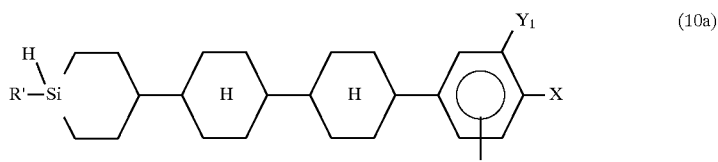
(10a)
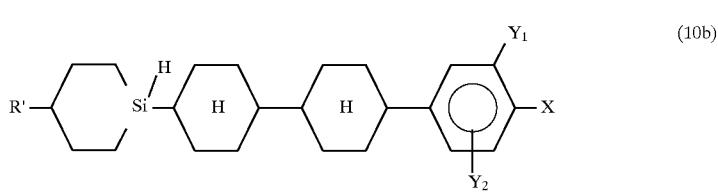
(10b)
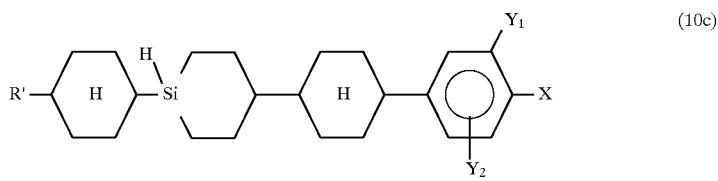
(10c)
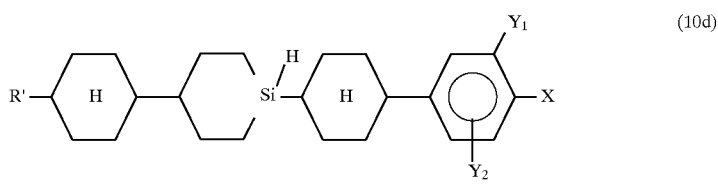
(10d)
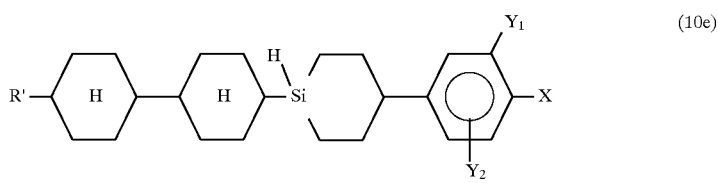
(10e)
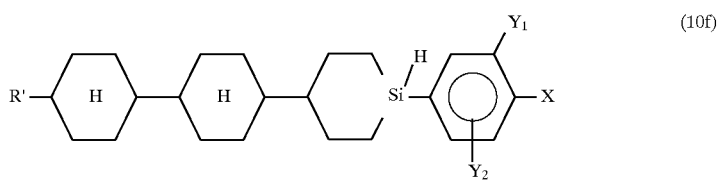
(10f)
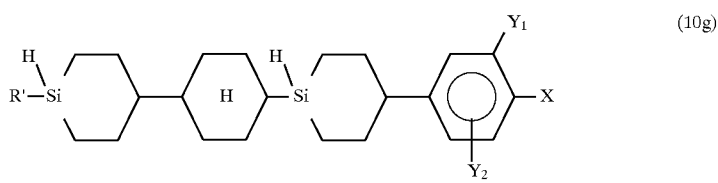
(10g)

-continued
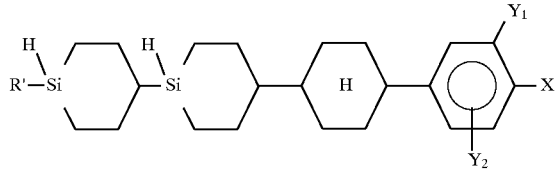
(10h)
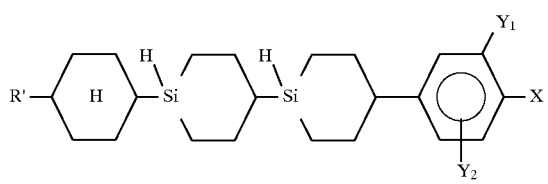
(10i)
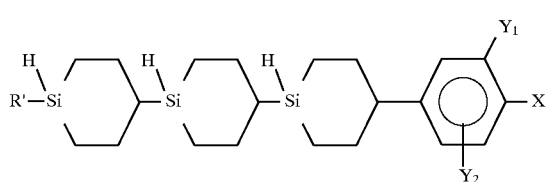
(10j)
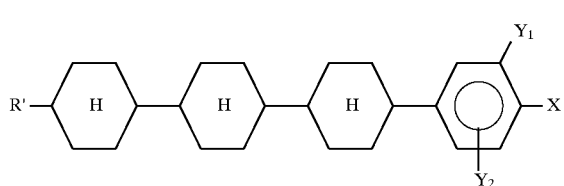
(10k)
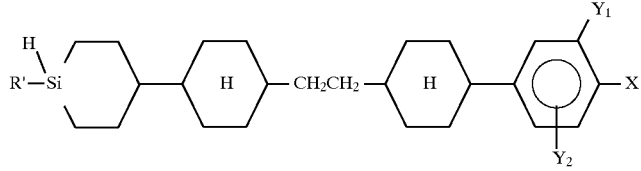
(10l)
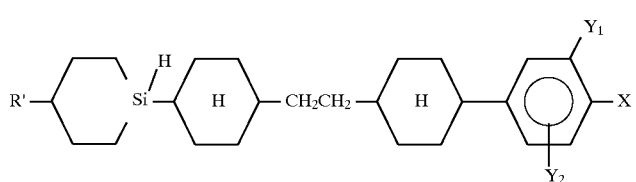
(10m)
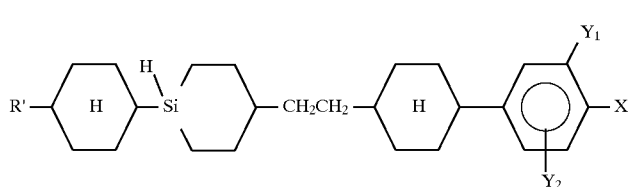
(10n)
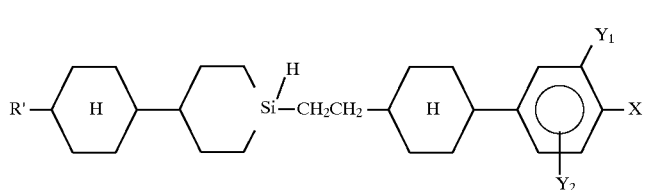
(10o)
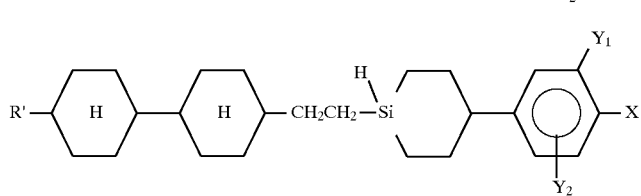
(10p)

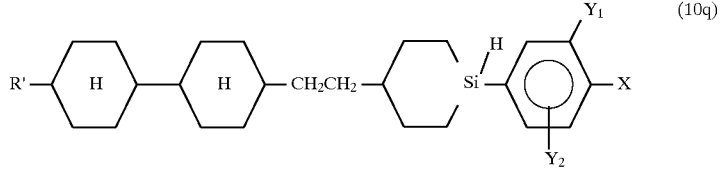 (10q)
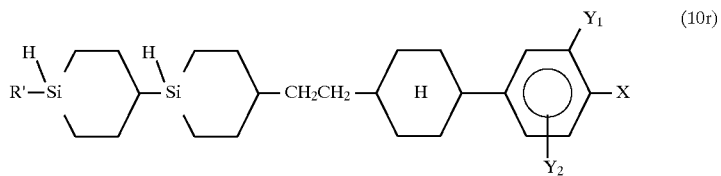 (10r)
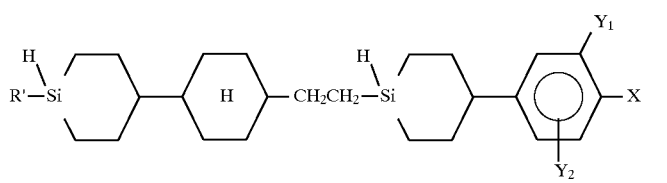 (10s)
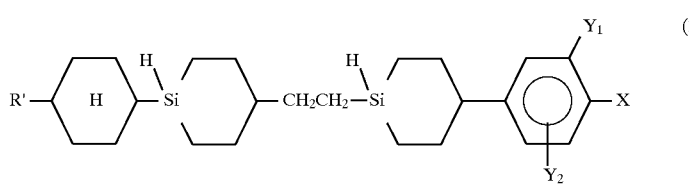 (10t)
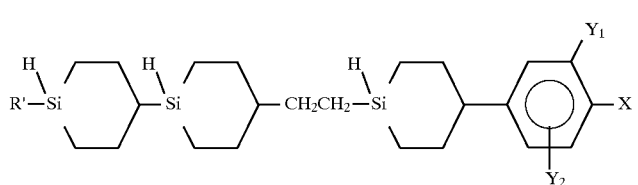 (10u)
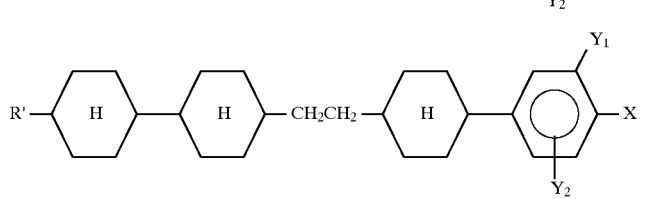 (10v)
In the above formulae, R', $X_1$, $Y_1$, $Y_2$ and the steric configurations of the rings are as defined for the compounds of the general formula (3). The partial skeleton structure
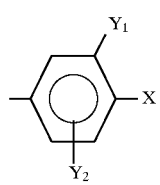
is as defined for the compounds of the general formula (3).
Next, specific chemical structures represented by the compounds of the general formula (11) are as follows:
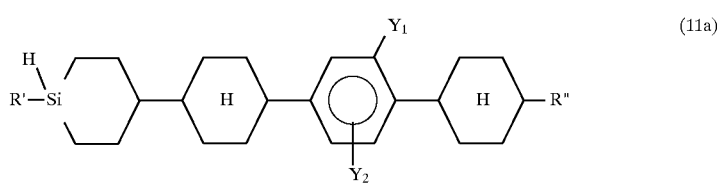 (11a)

-continued
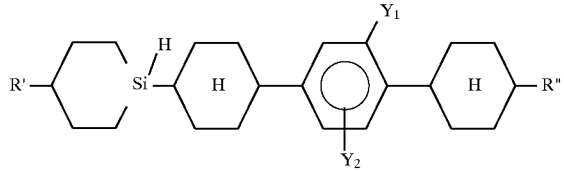
(11b)
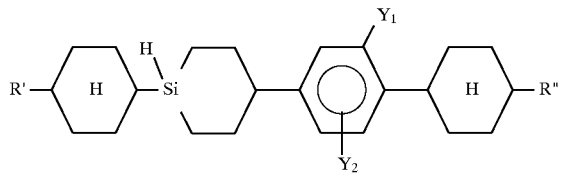
(11c)
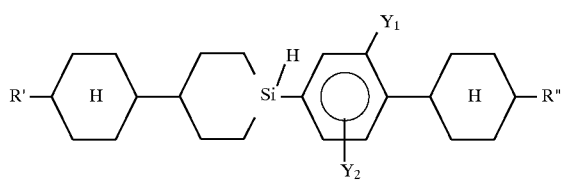
(11d)
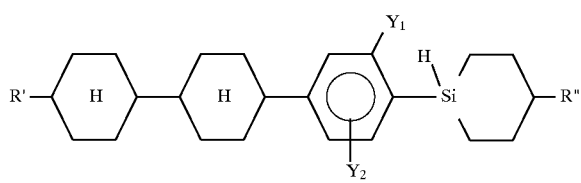
(11e)
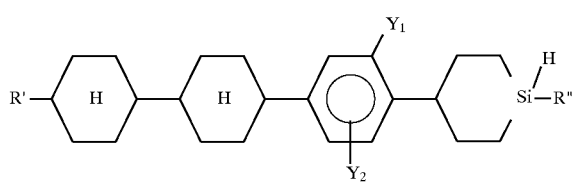
(11f)
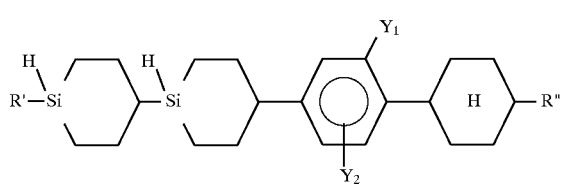
(11g)
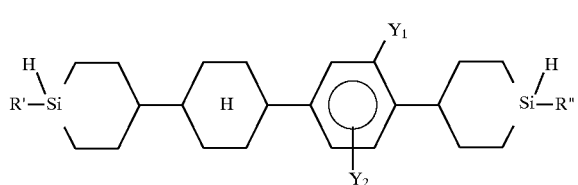
(11h)
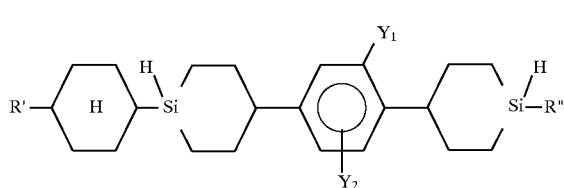
(11i)
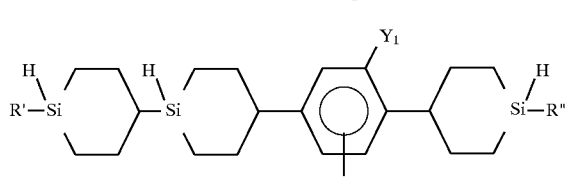
(11j)

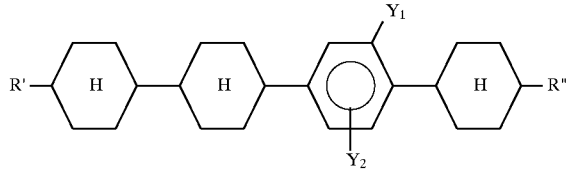
(11k)
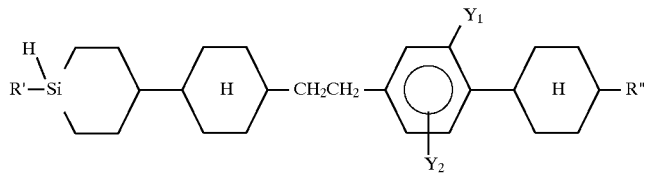
(11l)
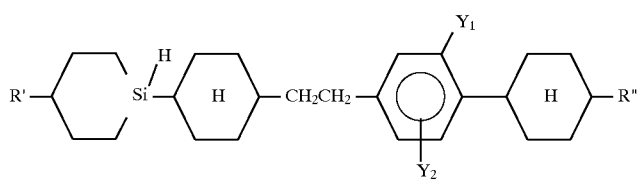
(11m)
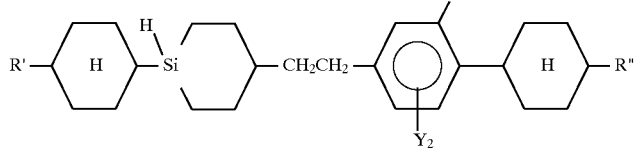
(11n)
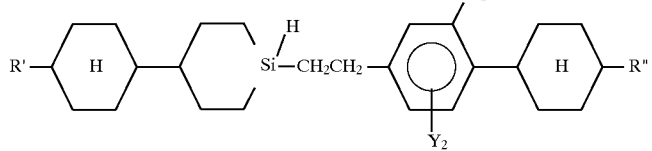
(11o)
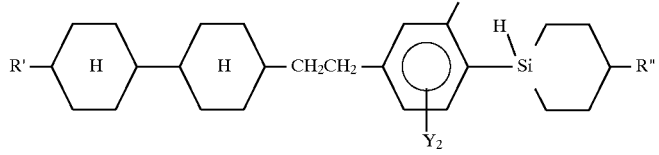
(11p)
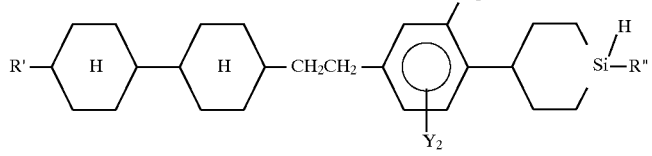
(11q)
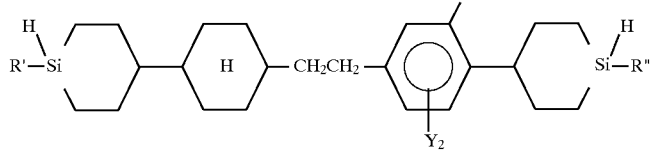
(11r)
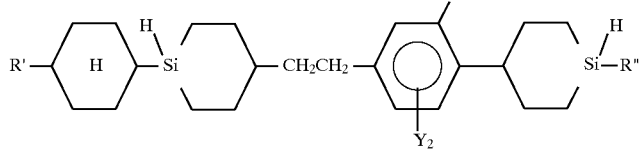
(11s)

-continued

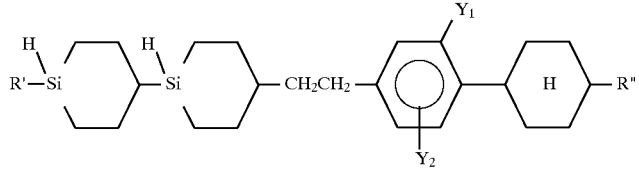 (11t)

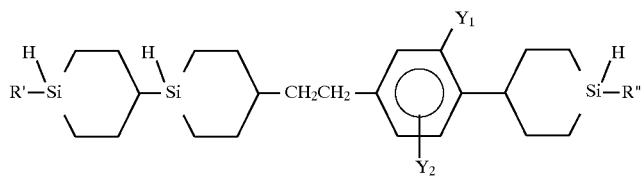 (11u)

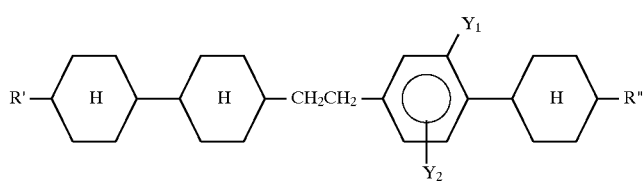 (11v)

In the above formulae, R', $Y_1$, $Y_2$ and the steric configurations of the rings are as defined for the compounds of the general formula (3). R" is as defined for R'.

Specific examples of the partial skeleton structure

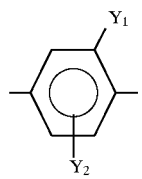

are as follows:

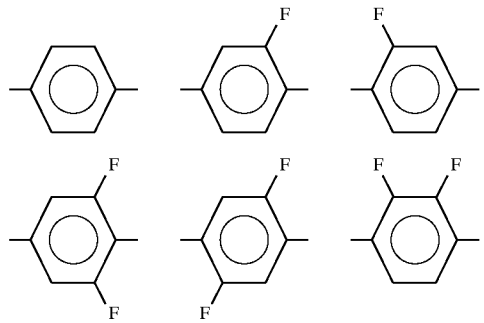

Among the foregoing examples, the following ones are especially preferred because they can provide the liquid crystal compositions with a nematic liquid crystal phase over a wide temperature range, a high response speed, a low threshold voltage, and low-temperature nematic stability.

Preferred examples of R' are as follows:

(e) $C_{2-7}$ alkyl groups, including ethyl, n-propyl, n-butyl, n-pentyl, n-hexyl and n-heptyl group.

(f) $C_{2-7}$ alkoxyalkyl groups, including methoxymethyl, 2-methoxyethyl, 3-methoxypropyl, 5-methoxypentyl, ethoxymethyl, 2-ethoxyethyl, (n-propoxy)methyl and (n-pentoxy)methyl group.

(g) $C_{2-7}$ mono- and difluoroalkyl groups, including 2-fluoroethyl, 2-fluoropropyl, 4-fluorobutyl, 4-fluoropentyl, 5-fluoropentyl, 6-fluorohexyl, 7-fluoroheptyl, 1,1-difluoroethyl, 2,2-difluoroethyl, 2,2-difluoropropyl, 2,2-difluorobutyl, 4,4-difluorobutyl and 4,4-difluoropentyl.

(h) $C_{2-7}$ alkenyl groups, including vinyl, 1E-propenyl, 1E-butenyl, 1E-pentenyl, 1E-hexenyl, 1E-heptenyl, 3-butenyl, 3E-pentenyl, 3E-hexenyl, 3E-heptenyl, 4-pentenyl, 4E-hexenyl, 4Z-hexenyl, 4E-heptenyl, 4Z-heptenyl, 5-hexenyl and 6-heptenyl.

Preferred examples of X in the general formula (2) are $OC_kH_{2k+1}$, $C_kH_{2k+1}$, $OCH_2CHF_2$, $OCF_2CHFCF_3$, $CH_2CHF_2$, $CH=CF_2$ and $CF=CFH$.

Preferred examples of the partial skeleton structure

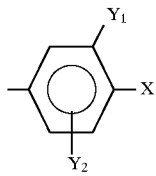

are as follows:

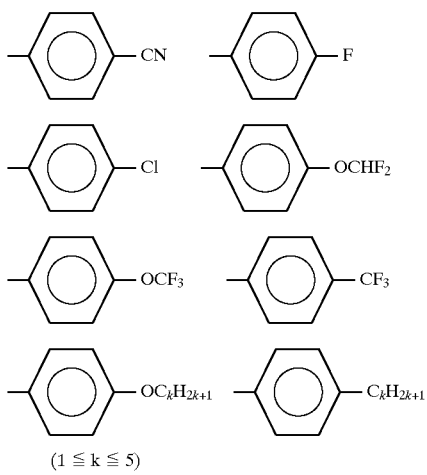

$(1 \leq k \leq 5)$

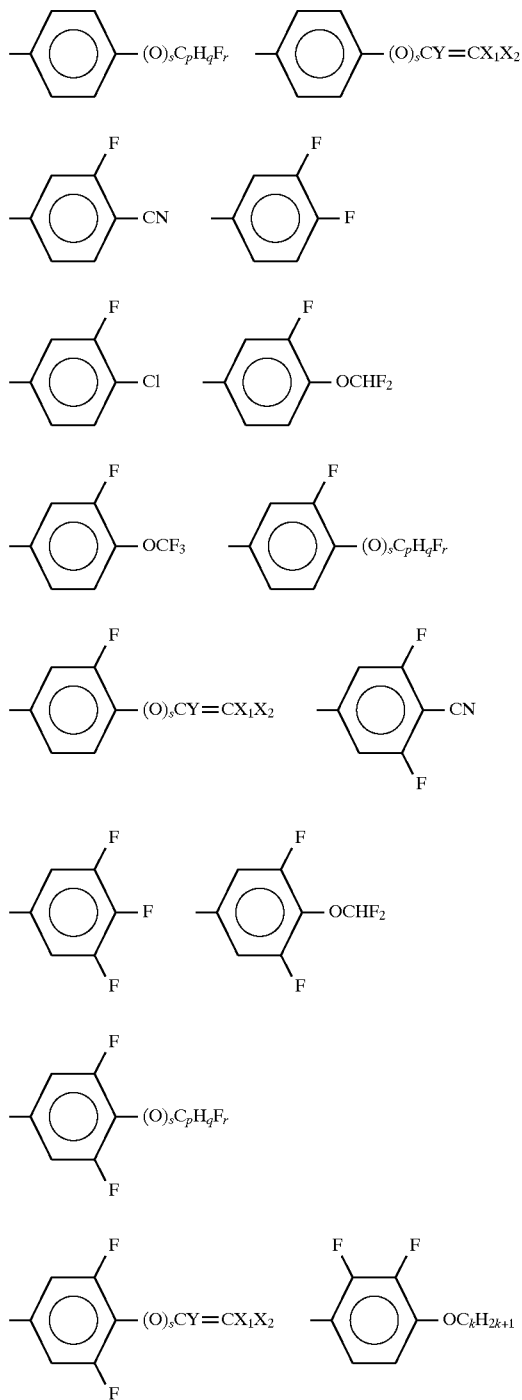
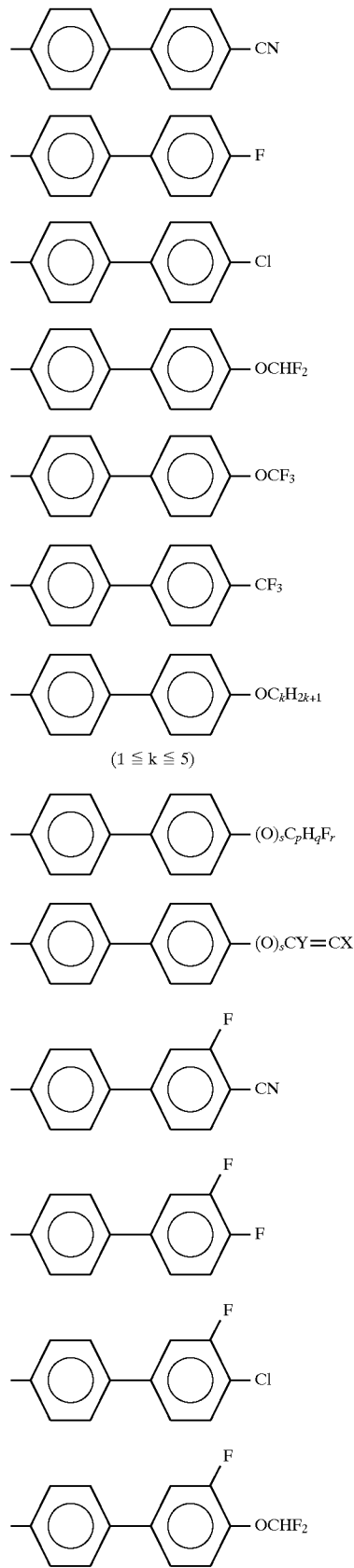
Preferred examples of the partial skeleton structure are as follows.
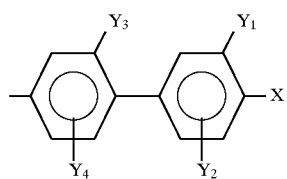

-continued
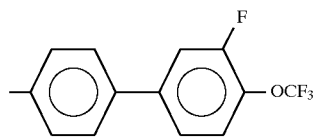
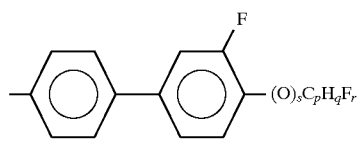
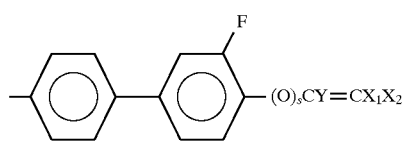
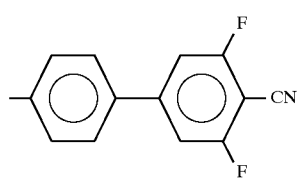
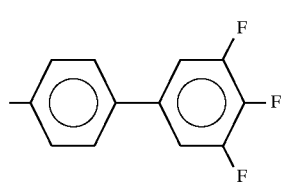
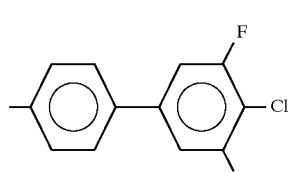
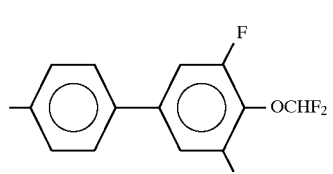
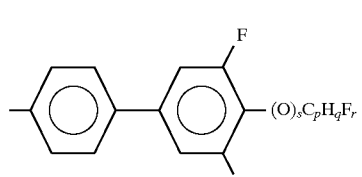
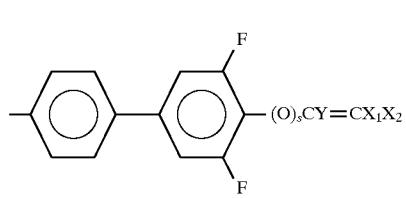
-continued
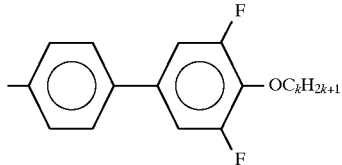
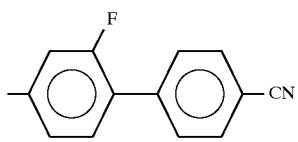
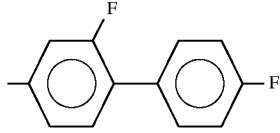
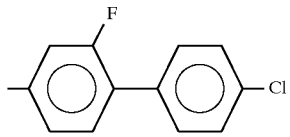
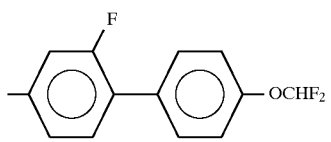
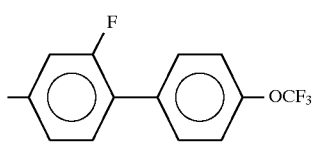
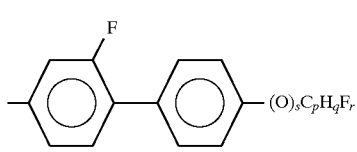
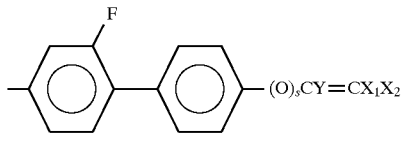
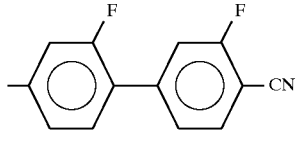
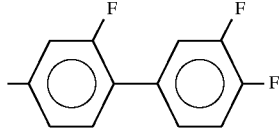
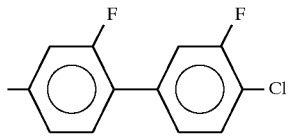

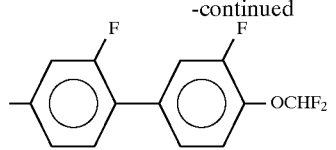
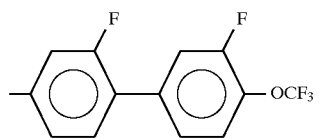
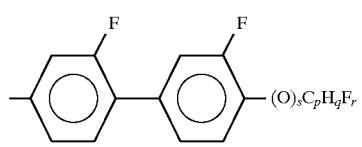
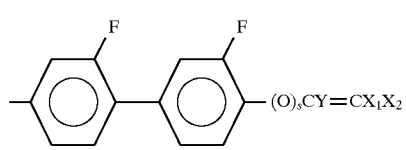
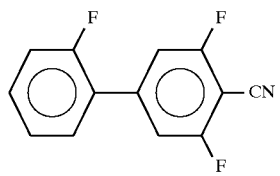
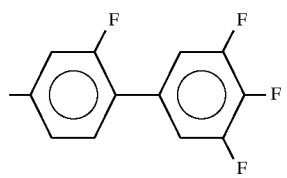
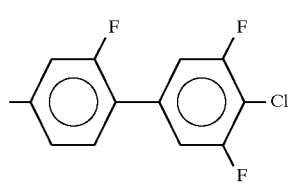
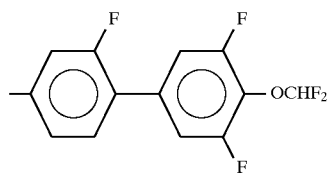
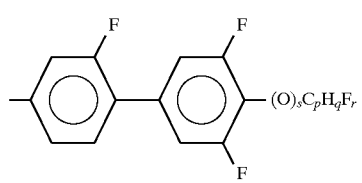
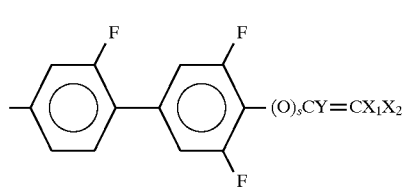
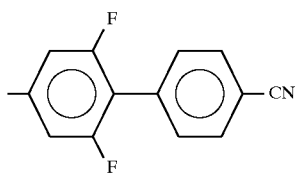
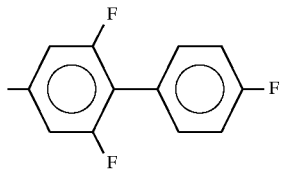
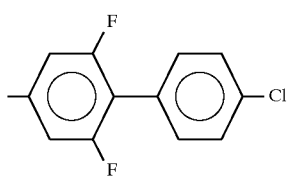
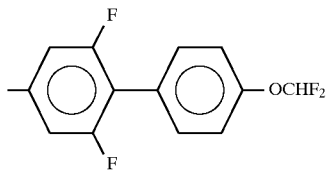
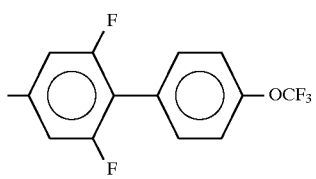
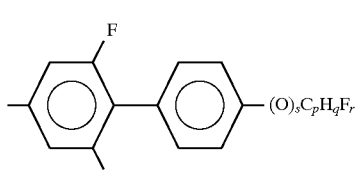
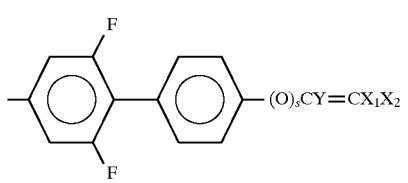
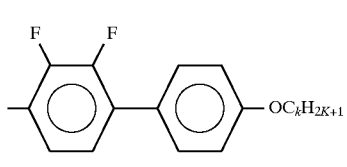
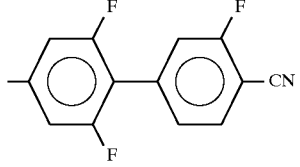

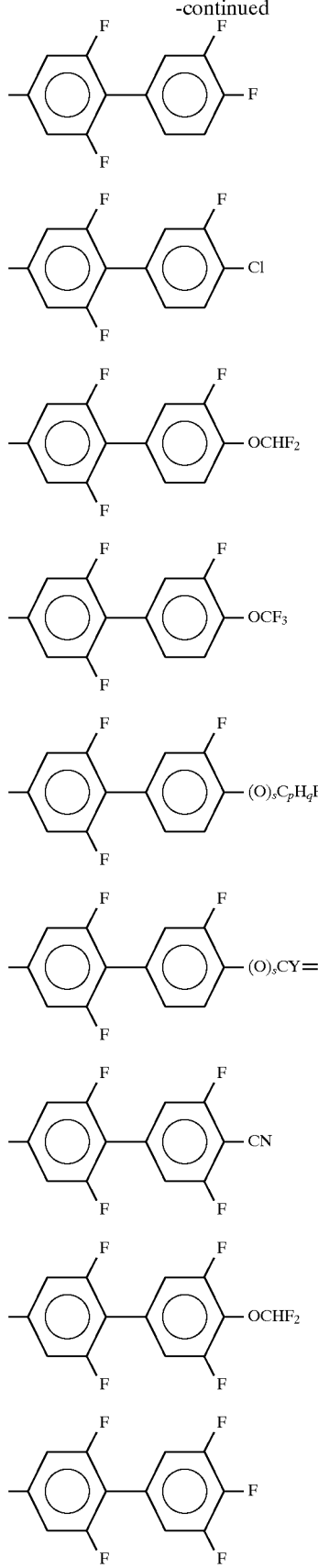
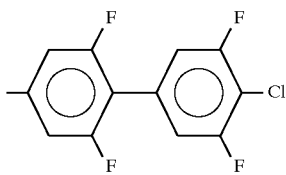
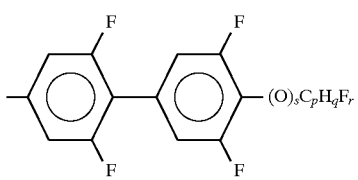
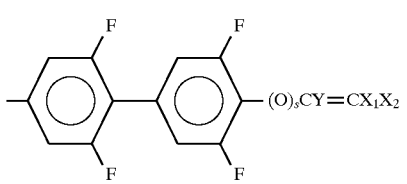
Preferred examples of the partial skeleton structure
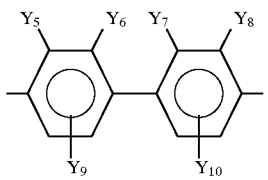
are as follows:
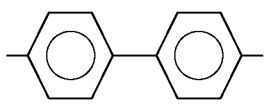
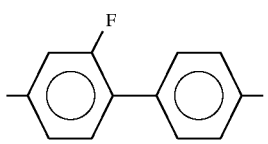
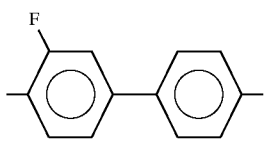
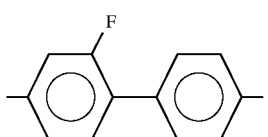

Preferred examples of the partial skeleton structure
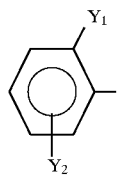
are as follows:
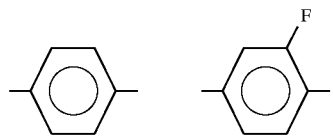
Preferred examples of the ring structures are as follows:
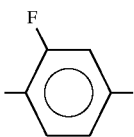 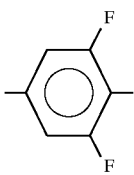
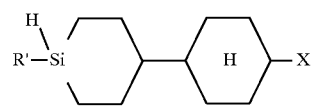
(2a)
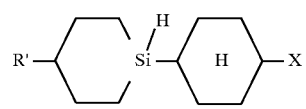
(2b)
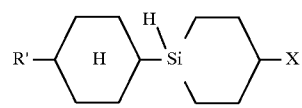
(2c)
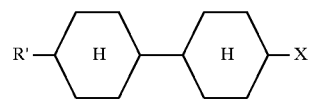
(2e)
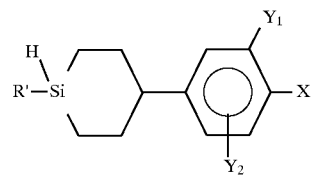
(3a)
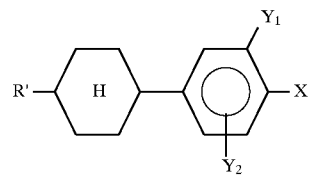
(3c)
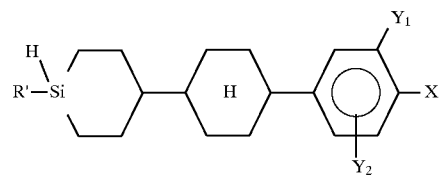
(3d)
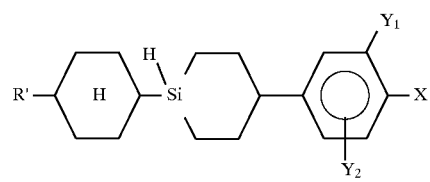
(3f)

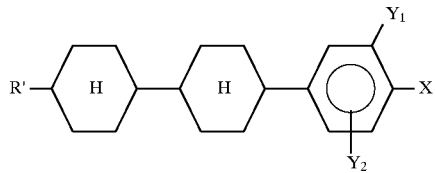
(3i)
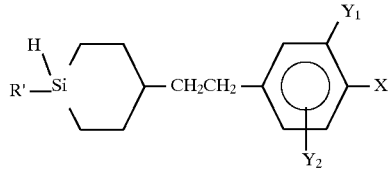
(4a)
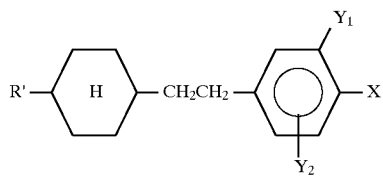
(4c)
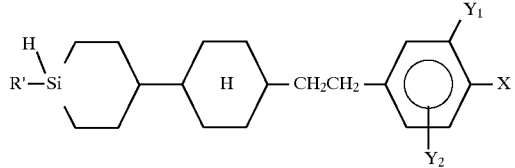
(4d)
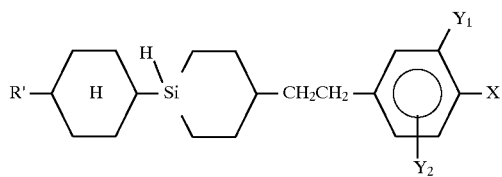
(4f)
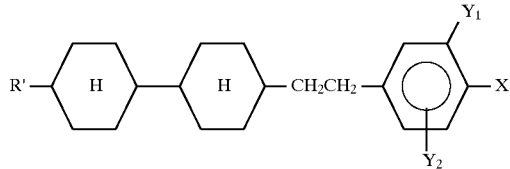
(4i)
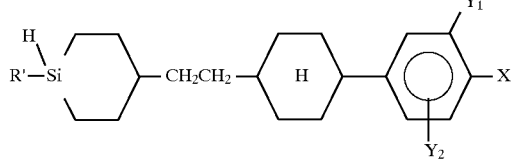
(5a)
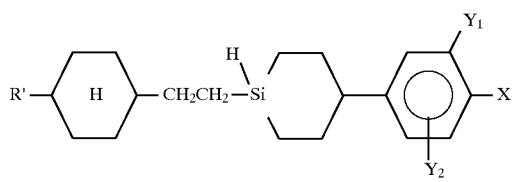
(5c)
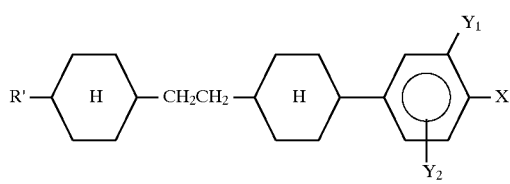
(5f)

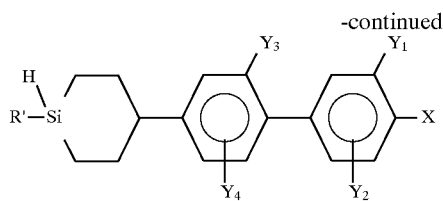 (6a)
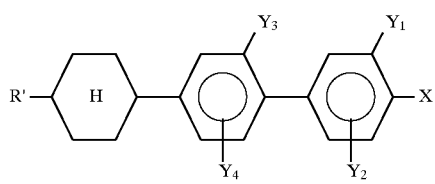 (6c)
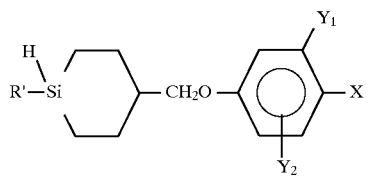 (7a)
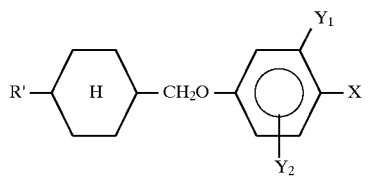 (7c)
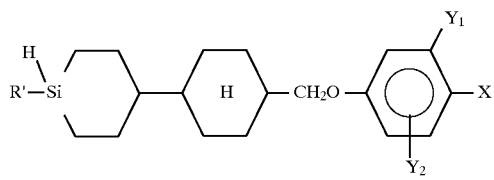 (7d)
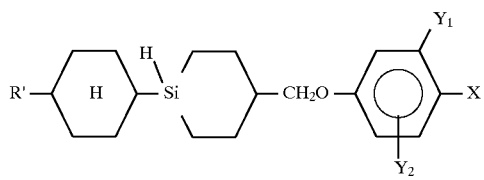 (7f)
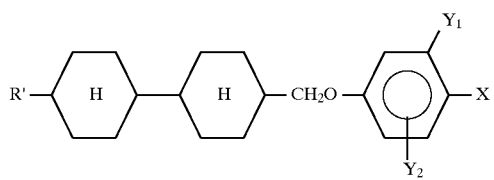 (7i)
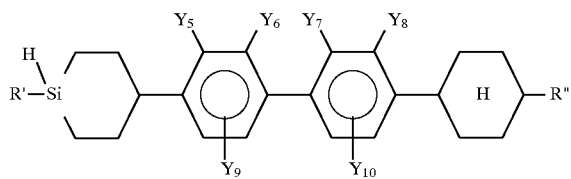 (8a)
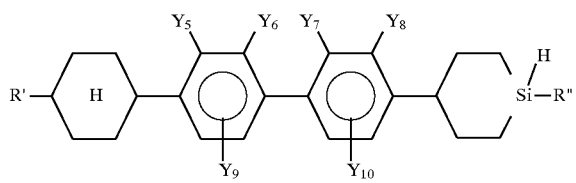 (8d)

-continued
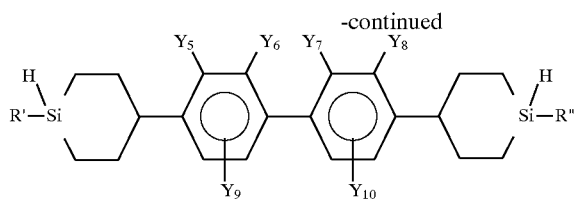 (8e)
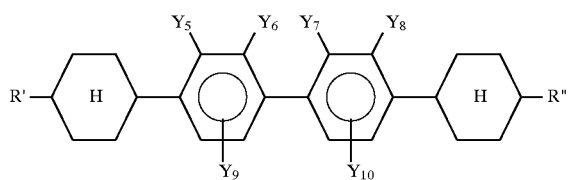 (8g)
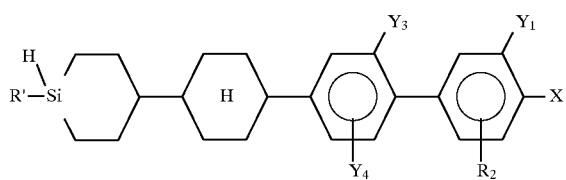 (9a)
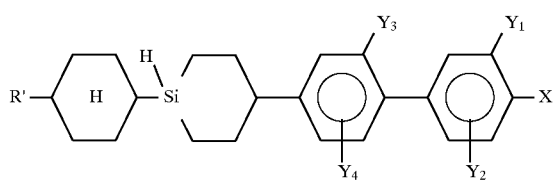 (9c)
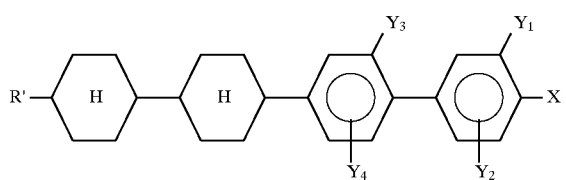 (9f)
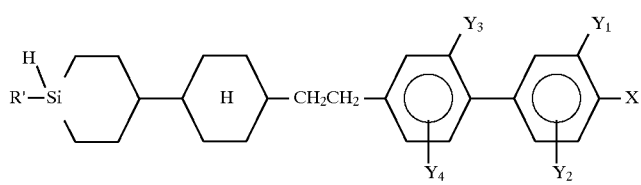 (9g)
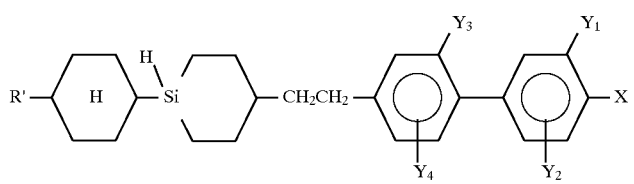 (9i)
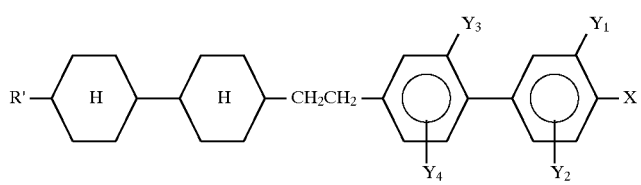 (9l)
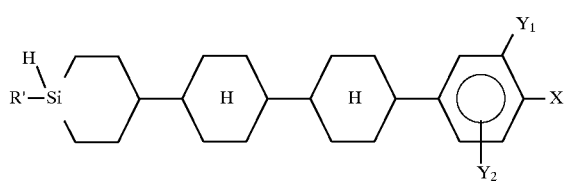 (10a)

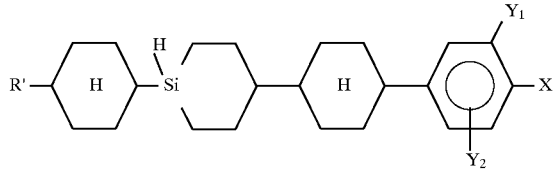
(10c)
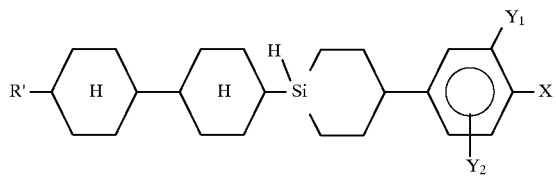
(10e)
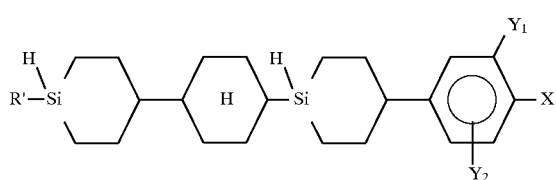
(10g)
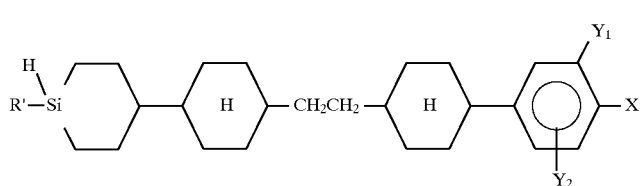
(10l)
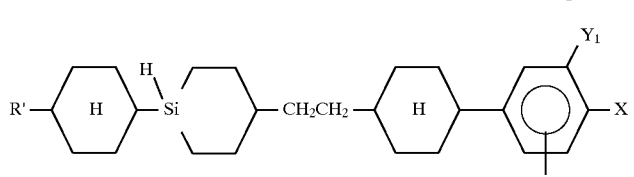
(10n)
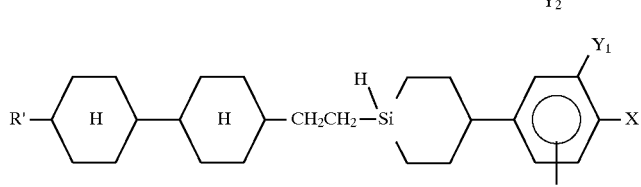
(10p)
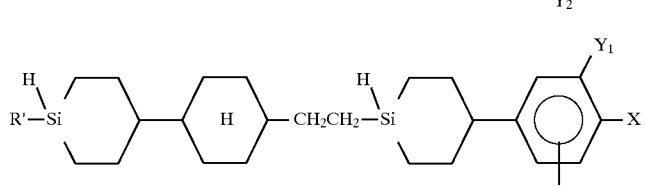
(10s)
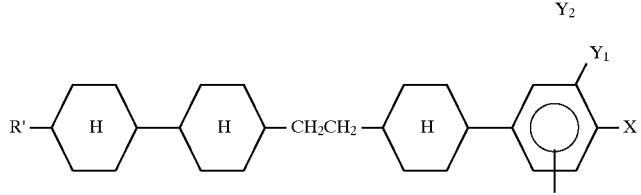
(10v)
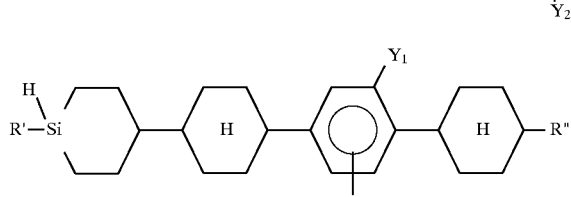
(11a)

-continued
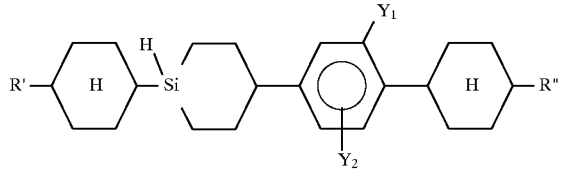 (11c)
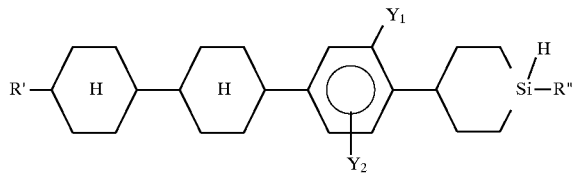 (11f)
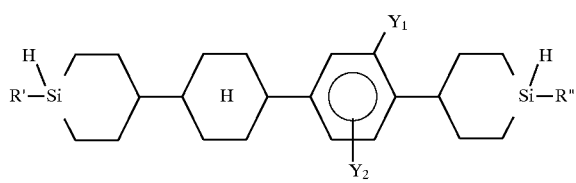 (11h)
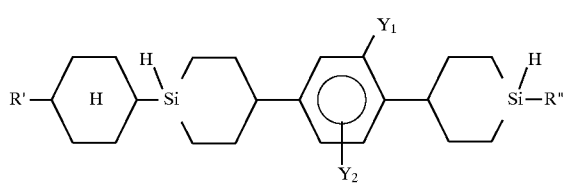 (11i)
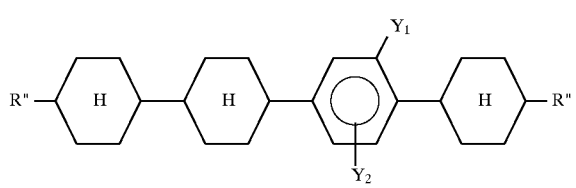 (11k)
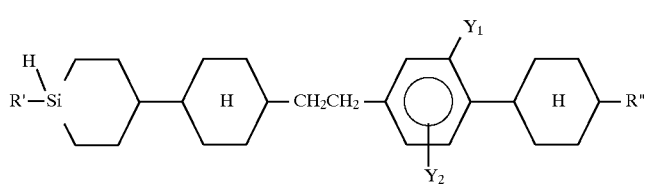 (11l)
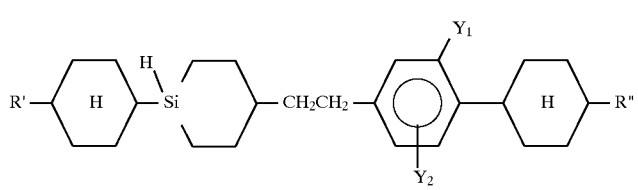 (11n)
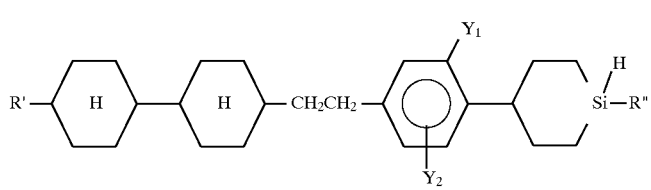 (11q)
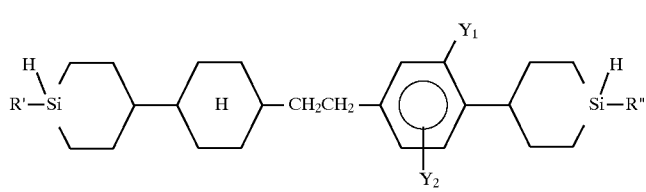 (11r)

-continued

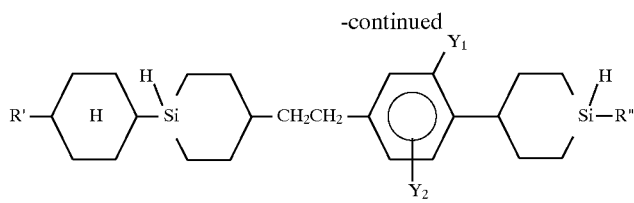
(11s)

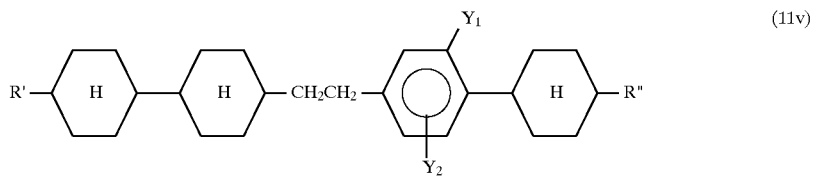
(11v)

With regard to the proportions of these various components in the liquid crystal composition, it is preferable that the proportion of Group A comprising one or more compounds selected from the compounds of the general formulae (2a)–(2e), (3a)–(3c), (4a)–(4c) and (7a)–(7c) is in the range of 0 to 30 mole % and the proportion of Group B comprising one or more compounds selected from the compounds of the general formulae (3d)–(3i), (4d)–(4i), (5a)–(5f), (6a)–(6c), and (7d)–(7i) is in the range of 50 to 100 mole %. More preferably, the proportions of Groups A and B are in the range of 2 to 20 mole % and 70 to 96 mole %, respectively. Also, it is preferable that proportions of the general formula (8)–(11) and (2)–(7) are in the range of 0 to 20 mole % and 80 to 100 mole %, respectively.

Where Group C comprising one or more compounds selected from the compounds of the general formulae (8a)–(8g), (9a)–(9l), (10a)–(10v) and (11a)–(11v) is added, the proportion thereof is preferably in the range of 0 to 20 mole %. More preferably, it is in the range of 2 to 15 mole %.

If the proportion of Group A is excessively high, the response speed is advantageously increased and the threshold voltage is advantageously lowered, but the upper temperature limit of the nematic phase is reduced to narrow the mesomorphic range. Conversely, if it is excessively low, the response speed is decreased.

If the proportion of Group B is excessively high, the threshold voltage is advantageously lowered, but the response speed is decreased. Conversely, if it is excessively low, it is disadvantageous for the purpose of lowering the threshold voltage.

Although a liquid crystal composition can be formed by using only Groups A and B, Group C may be added in order to extend the nematic phase to the higher temperature side. However, an excessively high proportion of group C is disadvantageous for the purpose of increasing the response speed, lowering the threshold voltage, and stabilizing the nematic phase at low temperatures.

The refractive index anisotropy ($\Delta n$), which is a property associated with panel design characteristics such as viewing angle and the like, can be controlled by varying the proportion of the compounds of the general formulae (6a)–(6c) and, though secondarily, the proportion of the compounds of the general formulae (8a)–(8g) and (9a)–(9l). These components are added in an excessively low proportion for Gooch-Tarry's first transmission minimum panel, and in an excessively high proportion for Gooch-Tarry's second transmission minimum panel.

In recent years, liquid crystal panels have increasingly wide applications including, for example, office-automation equipment, on-vehicle equipment and portable electronic equipment, and the requirements for their properties are being diversified according to the particular application. In order to meet these diversely required properties, liquid crystal compositions having a positive or negative $\Delta\epsilon$ value can be formed by selecting suitable compounds from the compounds of the general formulae (2) to (11) and mixing them in optimum proportions.

In order to mix these components, minor components may be added to and dissolved in major components. If necessary, the dissolution may be facilitated by heating the mixture to 30°–100° C. Alternatively, this may be done by dissolving these components into 1–10 equal volume of an organic solvent such as hexane, methanol or chloroform, mixing the resulting solutions, and then evaporating the organic solvent.

The liquid crystal composition thus obtained has a nematic liquid crystal phase over a wide temperature range extending from a lower limit of −20° C. or below to an upper limit of 70°–100° C., and does not produce a smectic phase or a crystalline phase even after long-term storage at −20° C. Its threshold voltage is not higher than 1.6 V and often in the range of 1.1 to 1.5 V.

In the above nematic liquid crystal composition, a desired twisted helical pitch can be induced by adding thereto an optically active compound having at least one silacyclohexane ring in the molecular structure as represented by the general formula (1), in an appropriate amount (preferably in an amount of 0.05 to 10% by weight based on the total weight of the twisted nematic liquid crystal composition).

The optically active compound may be directly added to and dissolved in the nematic liquid crystal composition. If necessary, the dissolution may be facilitated by heating the mixture to 30°–100° C. Alternatively, this may be done by dissolving the optically active compound into 1–10 equal volume of an organic solvent such as acetone, methanol or chloroform, mixing the resulting solution with the nematic liquid crystal composition, and then evaporating the organic solvent.

The required twisted helical pitch varies according to the display mode. Generally, it is in the range of 40 to 100 $\mu$m for the TN mode, 5 to 20 $\mu$m for the STN, SBE and OMI mode, and 2 to 10 $\mu$m for the PCGH and PC modes. The feature of the present invention is that such a value can be achieved by the addition of a small amount of an optically active substance. In order to be more effective, i.e., in order to obtain a low value of the PC product, it is necessary that, among the various components of the nematic liquid crystal composition comprising Groups A and B and optionally Group C, the proportion of the liquid crystal compound(s) having a silacyclohexane ring in the molecular structure be made as high as possible. That is, it is preferable to use the liquid crystal compound(s) having a silacyclohexane ring in a proportion of not less than 50 mole % and more preferably 100 mole %.

The feature of the present invention can be very effectively utilized in PCGH type liquid crystal compositions. When twisted nematic liquid crystal compositions obtained in the above-described manner are used in such applications, dichromatic dyes such as azo and anthraquinone dyes are added thereto.

Preferred dichromatic dyes usable for this purpose are azo dyes and anthraquinone dyes. More specifically, the dichromatic dyes which can be added to the liquid crystal compositions of the present invention include azo dyes of the general formula

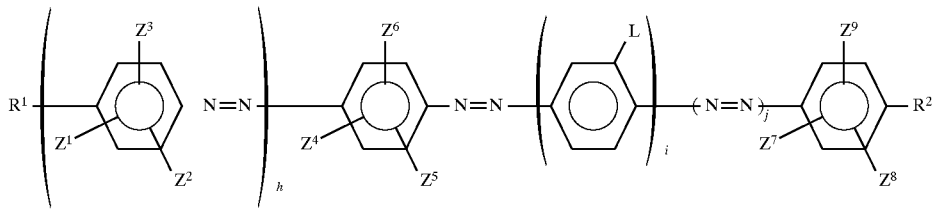

wherein $R^1$ and $R^2$ are each a substituted or unsubstituted alkyl group or a dialkylamino group, the substituted alkyl group is an alkyl group substituted with a plurality of fluorine atoms or an alkyl group in which —$CH_2$— groups not adjacent to each other are substituted with O, S, NH, $SO_2$, $O_2C$,

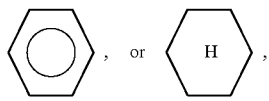

$Z^1$ to $Z^9$ are each hydrogen, methyl, methoxy or halogen, $Z^1$ and $Z^2$, $Z^4$ and $Z^5$, or $Z^7$ and $Z^8$ may be joined together to form an aliphatic ring, an aromatic ring or a nitrogen-containing aromatic ring, L is a fluoroalkyl group, h is 0, 1 or 2, i is 0, 1 or 2, and j is 0 or 1, provided that j is 0 when i is 0; and anthraquinone dyes of the general formula

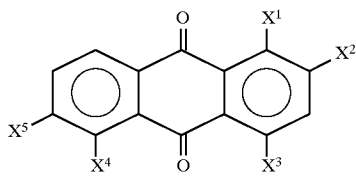

wherein $X^1$ to $X^5$ are each H, OH, halogen, CN, an unsubstituted or substituted amino group, an unsubstituted or substituted carboxylic acid ester group, an unsubstituted or substituted phenyloxy group, an unsubstituted or substituted benzyl group, an unsubstituted or substituted phenylthio group, an unsubstituted or substituted phenyl group, an unsubstituted or substituted cyclohexyloxycarbonyl group, or an unsubstituted or substituted pyridyl or pyrimidyl group. These dichromatic dyes are preferably added to the liquid crystal compositions in an amount of 0.2 to 5% by weight.

The twisted nematic liquid crystal compositions thus obtained can be used in liquid crystal display devices by sandwiching them between transparent substrates on which active devices (such as TFTs or MINs) or simple matrix electrodes are formed. These display devices may have various undercoats, orientation-controlling overcoats, polarizing plates, filters, reflective layers and the like as required. Moreover, these display devices may be constructed in various ways, for example, by forming them into multilayer cells, combining them with other display devices, using semiconductor substrates, or using light sources.

EXAMPLE 1

A nematic liquid crystal composition was prepared according to the following formulation in which all components were compounds having a silacyclohexane ring. This liquid crystal composition had a nematic-isotropic transition temperature ($T_{NI}$) of 80.9° C.

4-[trans-4-(trans-4-n-propyl-4-silacyclohexyl)-cyclohexyl]-1,2,6-trifluorobenzene 37.5 mole %

4-[trans-4-(trans-4-n-pentyl-4-silacyclohexyl)-cyclohexyl]-1,2,6-trifluorobenzene 19.8 mole %

4-[trans-4-(trans-4-n-propyl-4-silacyclohexyl)-cyclohexyl]-1-trifluoromethoxybenzene 10.9 mole %

4-[trans-4-(trans-4-n-pentyl-4-silacyclohexyl)-cyclohexyl]-1-trifluoromethoxybenzene 7.8 mole %

4'-(trans-4-n-propyl-4-silacyclohexyl)-2',6'-difluoro-4-trifluoromethoxybiphenyl 5.4 mole %

4'-(trans-4-n-pentyl-4-silacyclohexyl)-2',6'-difluoro-4-trifluoromethoxybiphenyl 6.6 mole % trans,trans-4'-[4-(4-n-Propyl-4-silacyclohexyl)-cyclohexyl]-3,4,5-trifluorobiphenyl 6.6 mole % trans,trans-4'-[4-(4-n-pentyl-4-silacyclohexyl)-cyclohexyl]-3,4,5-trifluorobiphenyl 5.4 mole %

Each of the following seven optically active substances A–G was added to the above liquid crystal composition at the concentration given below. With regard to the resulting compositions, the twisted helical pitch was measured according to Cano's optical wedge method and the direction of twist was measured by a test involving contact with cholesteryl nonanoate (left-handed twist). The results thus obtained are shown in Table 1. The PC products calculated from these results are shown in Table 2.

A: (R)-(+)-4-[trans-4-(trans-4-n-pentyl-4-silacyclohexyl)-cyclohexyl]-1-(1-methylheptyloxy)-2,6-difluorobenzene. $[\alpha]^{25}_D$=+6.3 ($CHCl_3$). Optically active substance A is represented by the following formula:

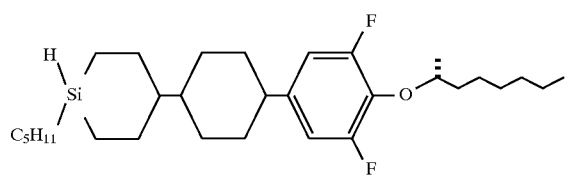

B: (R)-4-(trans-4-n-heptyl-4-silacyclohexyl)-1-(2-methylbutyl)-2,6-difluorobenzene. Optically active substance B is represented by the following formula:

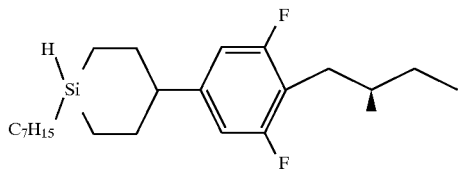

C:(S)(S)-4-(trans-4-(trans-4-n-pentyl-4-silacyclohexyl) cyclohexyl)-1-(2,4-difluoro-n-heptyloxy)-2,6-difluorobenzene. Optically active substance C is represented by the following formula:

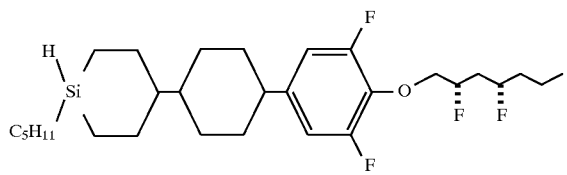

D:(S)(S)-4-trans-4-(trans-4-n-pentyl-4-silacyclohexyl) cyclohexyl)-1-(4,5-epoxy-n-heptyl)-2,6-difluorobenzene. Optically active substance D is represented by the following formula:

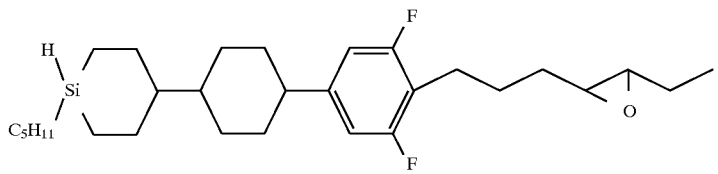

E: The compound obtained by substituting a carbon atom for the silicon atom in A. That is, R-(+)-4-[trans-4-(trans-4-n-pentylcyclohexyl)cyclohexyl]-1-(1-methylheptyloxy)-2,6-difluorobenzene. $[\alpha]^{25}_D$=+6.9 (CHCl$_3$). Optically active substance E is represented by the following formula:

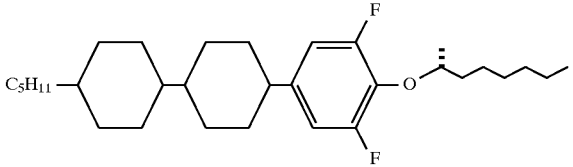

F: S-811 manufactured by Merck & Co., Inc. That is, (S)-(-)-4-n-hexyloxybenzoate-4'-carbo(1-methyl) heptyloxyphenyl ester. $[\alpha]^{25}_D$=+25.5 (CHCl$_3$). Optically active substance F is represented by the following formula:

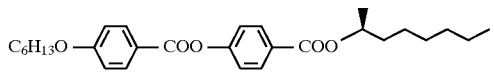

G: Cholesteryl nonanoate. $[\alpha]^{25}_D$=−29.8 (CHCl$_3$). Optically active substance G is represented by the following formula:

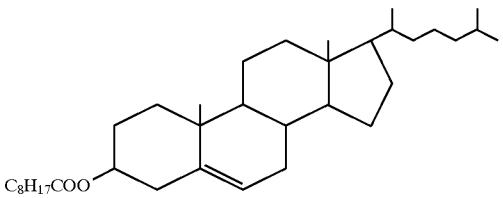

$[\alpha]^{25}_D$ indicates a value of optical rotation as measured in chloroform at 25° C. The percent concentration of the optically active substance based on the total weight of the twisted nematic liquid crystal composition was 0.104% by weight for A, 0.110% by weight for B, 0.108% by weight for C, 0.107% by weight for D, 0.109% by weight for E, 0.066% by weight for F, and 0.111% by weight for G.

EXAMPLE 2

A nematic liquid crystal composition was prepared according to the following formulation in which all components were compounds having a silacyclohexane ring. This liquid crystal composition had a nematic-isotropic transition temperature ($T_{NI}$) of 80.7° C.

trans,trans-4-(4-(3,4,5-trifluorophenyl)cyclohexyl)-1-n-propyl-1-silacyclohexane 18.1 mole % trans,trans-4-(4-(3,4,5-trifluorophenyl)cyclohexyl)-1-n-pentyl-1-silacyclohexane 9.6 mole % trans,trans-4-(4-(3,4-difluorophenyl)-1-silacyclohexyl)-1-n-propylcyclohexane 23.7 mole % trans,trans-4-(4-(3,4-difluorophenyl)-1-silacyclohexyl)-1-n-pentylcyclohexane 7.4 mole % trans,trans-4-(4-(2-(3,4,5-trifluorophenyl)ethyl)-1-silacyclohexyl)-1-n-propylcyclohexane 10.5 mole % trans,trans-4-(4-(2-(3,4,5-trifluorophenyl)ethyl)-1-silacyclohexyl)-1-n-pentylcyclohexane 4.1 mole % trans-4-(4-(4-trifluoromethoxyphenyl)-3,5-difluorophenyl)-1-n-propyl-1-silacyclohexane 2.0 mole % trans-4-(4-(4-trifluoromethoxyphenyl)-3,5-difluorophenyl)-1-n-phenyl-1-silacyclohexane 2.5 mole % trans-4-(4-(3,4,5-trifluorophenyl)-3-fluorophenyl)-1-n-propyl-1-silacyclohexane 4.5 mole % trans-4-(4-(3,4,5-trifluorophenyl)-3-fluorophenyl)-1-n-pentyl-1-silacyclohexane 4.0 mole % trans,trans-4-(4-(4-(3,4,5-trifluorophenyl)phenyl) cyclohexyl)-1-n-propyl-1-silacyclohexane 7.5 mole % trans,trans-4-(4-(4-(3,4,5-trifluorophenyl)phenyl) cyclohexyl)-1-n-pentyl-1-silacyclohexane 6.1 mole %

In the same manner as in Example 1, each of optically active substances A–G was added to the above liquid crystal composition at the concentration given below. With regard to the resulting compositions, the twisted helical pitch and the direction of twist were measured. The results thus obtained are shown in Tables 1 and 2.

The percent concentration of the optically active substance was 0.120% by weight for A, 0.116% by weight for B, 0.112% by weight for C, 0.110% by weight for D, 0.110% by weight for E, 0.075% by weight for F, and 0.195% by weight for G.

Comparative Example 1

A nematic liquid crystal composition was prepared according to the following formulation in which the components include no compound having a silacyclohexane ring. This liquid crystal composition had a $T_{NI}$ of 92.0° C.

4-(trans-4-n-pentylcyclohexyl)-1-fluorobenzene 11.4 mole %
4-(trans-4-n-hexylcyclohexyl)-1-fluorobenzene 8.9 mole %
4-(trans-4-n-heptylcyclohexyl)-1-fluorobenzene 6.7 mole %
4-[trans-4-(trans-4-ethylcyclohexyl)-cyclohexyl]-1-trifluoromethoxybenzene 7.1 mole %
4-[trans-4-(trans-4-n-propylcyclohexyl)-cyclohexyl]-1-trifluoromethoxybenzene 10.8 mole %
b 4-[trans-4-(trans-4-n-butylcyclohexyl)-cyclohexyl]-1-trifluoromethoxybenzene 6.3 mole %
4-[trans-4-(trans-4-n-pentylcyclohexyl)-cyclohexyl]-1-trifluoromethoxybenzene 9.9 mole %
trans-4-{trans-4-[2-(4-trifluoromethoxyphenyl)-ethyl]cyclohexyl}-1-n-propylcyclohexane 4.6 mole %
trans-4-{trans-4-[2-(4-trifluoromethoxyphenyl)-ethyl]cyclohexyl}-1-n-pentylcyclohexane 4.6 mole %
4'-(trans-4-n-propylcyclohexyl)-3,4-difluorobiphenyl 12.6 mole %
4'-(trans-4-n-pentylcyclohexyl)-3,4-difluorobiphenyl 10.5 mole %
trans,trans-2'-fluoro-4,4'-bis(4-n-propylcyclohexyl)biphenyl 2.2 mole %
trans,trans-2'-fluoro-4'-(4-n-propylcyclohexyl)-4-(4-n-pentylcyclohexyl)biphenyl 2.2 mole %
trans,trans-2'-fluoro-4,4'-bis(4-n-pentylcyclohexyl)biphenyl 2.2 mole %

In the same manner as in Example 1, each of optically active substances A–G was added to the above liquid crystal composition at the concentration given below. With regard to the resulting compositions, the twisted helical pitch and the direction of twist were measured. The results thus obtained are shown in Tables 1 and 2.

The percent concentration of the optically active substance was 0.138% by weight for A, 0.121% by weight for B, 0.115% by weight for C, 0.108% by weight for D, 0.104% by weight for E, 0.080% by weight for F, and 0.210% by weight for G.

Comparative Example 2

A nematic liquid crystal composition was prepared according to the following formulation in which the components include no compound having a silacyclohexane ring. This liquid crystal composition had a $T_{NI}$ of 85° C.

4-(trans-4-n-propylcyclohexyl)-1-ethylbenzene 5.3 mole %
4-(trans-4-n-ethylcyclohexyl)-1-cyanobenzene 4.9 mole %
4-(trans-4-n-propylcyclohexyl)-1-cyanobenzene 14.6 mole %
4-(trans-4-n-butylcyclohexyl)-1-cyanobenzene 10.8 mole %
4-(trans-4-n-pentylcyclohexyl)-1-cyanobenzene 20.3 mole %
4-(trans-4-n-heptylcyclohexyl)-1-cyanobenzene 10.7 mole %
4'-(trans-4-n-propylcyclohexyl)-4-ethylbiphenyl 12.6 mole %
4'-(trans-4-n-pentylcyclohexyl)-4-ethylbiphenyl 10.5 mole %
trans,trans-4,4'-Bis(4-n-propylcyclohexyl)-biphenyl 4.2 mole %
trans,trans-4,4'-Bis(4-n-butylcyclohexyl)-biphenyl 6.1 mole %

In the same manner as in Example 1, each of optically active substances A–G was added to the above liquid crystal composition at the concentration given below. With regard to the resulting compositions, the twisted helical pitch and the direction of twist were measured. The results thus obtained are shown in Tables 1 and 2.

The percent concentration of the optically active substance was 0.114% by weight for A, 0.121% by weight for B, 0.110% by weight for C, 0.106% by weight for D, 0.108% by weight for E, 0.083% by weight for F, and 0.141% by weight for G.

TABLE 1

Direction of twist and twisted helical pitch

|   | Example 1 | Example 2 | Comparative Example 1 | Comparative Example 2 |
|---|---|---|---|---|
| A | Left-handed, 38 μm (0.104%) | Left-handed, 35 μm (0.120%) | Left-handed, 73 μm (0.138%) | Left-handed, 85 μm (0.114%) |
| B | Left-handed, 42 μm (0.110%) | Left-handed, 41 μm (0.116%) | Left-handed, 85 μm (0.121%) | Left-handed, 83 μm (0.121%) |
| C | Left-handed, 46 μm (0.108%) | Left-handed, 45 μm (0.112%) | Left-handed, 97 μm (0.115%) | Left-handed, 98 μm (0.110%) |
| D | Left-handed, 49 μm (0.107%) | Left-handed, 46 μm (0.110%) | Left-handed, 97 μm (0.108%) | Left-handed, 98 μm (0.106%) |
| E | Left-handed, 56 μm (0.109%) | Left-handed, 56 μm (0.110%) | Left-handed, 96 μm (0.104%) | Left-handed, 91 μm (0.108%) |
| F | Left-handed, 99 μm (0.066%) | Left-handed, 89 μm (0.075%) | Left-handed, 101 μm (0.080%) | Left-handed, 109 μm (0.083%) |
| G | Left-handed, 103 μm (0.111%) | Left-handed, 58 μm (0.195%) | Left-handed, 107 μm (0.210%) | Left-handed, 55 μm (0.141%) |

The values in parentheses indicate the concentrations (in % by weight) of the optically active substances added.

TABLE 2

PC product

| Optically active substance | Example 1 | Example 2 | Comp. Example 1 | Comp. Example 2 |
|---|---|---|---|---|
| A | 4.0 | 4.2 | 10.1 | 9.7 |
| B | 4.6 | 4.8 | 10.3 | 10.1 |
| C | 5.0 | 5.0 | 11.2 | 10.8 |
| D | 5.2 | 5.1 | 10.5 | 10.4 |
| E | 6.1 | 6.2 | 10.0 | 9.8 |
| F | 6.5 | 6.7 | 8.1 | 9.0 |
| G | 11.4 | 11.4 | 22.5 | 7.7 |

EXAMPLE 3

To the nematic liquid crystal composition used in Example 1, optically active substance A was added at varying concentrations. With regard to the resulting compositions, the twisted helical pitch was measured.

TABLE 3

| Amount of A added | Pitch | PC product |
|---|---|---|
| 0.114% by weight | 38 μm | 4.0 |
| 0.200% by weight | 20.5 μm | 4.1 |
| 1.00% by weight | 3.9 μm | 3.9 |
| 2.01% by weight | 2.1 μm | 4.2 |

It can be seen from the results shown in this table that helical pitches induced when an optically active substance is added at high concentrations can be estimated by using PC products obtained when it is added at low concentrations.

EXAMPLE 4

A mixed black dichromatic dye comprising 32.4% by weight of red dichromatic anthraquinone dye M-86, 45.9% by weight of blue dichromatic anthraquinone dye SI-497, and 21.7% by weight of yellow dichromatic azo dye SI-486 (all manufactured by Mitsui Toatsu Chemicals, Inc.) was prepared.

A twisted guest-host liquid crystal composition comprising 96.540% by weight of the same nematic liquid crystal composition as used in Example 1, 0.474% by weight of optically active substance A, and 2.986% by weight of the above mixed black dichromatic dye was prepared. When the PC product of this composition was measured, it had a small value of 4.2.

We claim:

1. A twisted nematic liquid crystal composition comprising:

(a) an optically active silacyclohexane compound of the general formula (1)

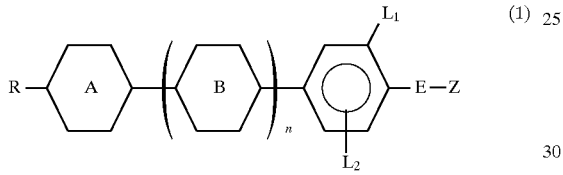

(1)

wherein R is a linear $C_{1-10}$ alkyl group, a branched $C_{3-8}$ alkyl group, a $C_{2-7}$ alkoxyalkyl group, a $C_{1-10}$ mono- or difluoroalkyl group, or a $C_{2-8}$ alkenyl group,

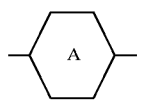

is a trans-1-sila-1,4-cyclohexylene or trans-4-sila-1,4-cyclohexylene group in which the silicon atom at the 1- or 4-position has a substituent comprising H, F, Cl or $CH_3$, or is a 1,4-cyclohexylene group,

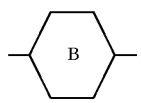

is a trans-1-sila-1,4-cyclohexylene or trans-4-sila-1,4-cyclohexylene group in which the silicon atom at the 1- or 4-position has a substituent comprising H, F, Cl or $CH_3$, or is a 1,4-cyclohexylene or 1,4-phenylene group, n is 0 or 1, E is —$CH_2$— or —O—, Z is a chiral group containing one or more chiral carbon atoms, and is selected from the group consisting of

—$(CH_2)_a$—$C^*R_oG$—$C_bH_{2b+1}$    (12a)

wherein a is an integer of 0 to 8, b is an integer of 2 to 14, $R_0$ is hydrogen or a linear $C_{1-6}$ alkyl group, G is $CH_3$, halogen, $CF_3$, $CHF_2$, $CH_2F$ or CN, and $C^*$ is a chiral carbon atoms which has four different substituents, so that three substituents, $R_0$, G, and —$C_bH_{2b+1}$ are different from each other,

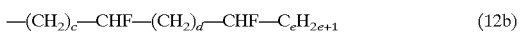
—$(CH_2)_c$—CHF—$(CH_2)_d$—CHF—$C_eH_{2e+1}$    (12b)

wherein c is an integer of 0 to 8, d is an integers of 0 to 6, and e is an integer of 1 to 10
and

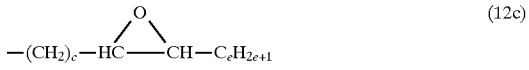

(12c)

wherein c is an integer of 0 to 8, and e is an integer 1 to 10, and $L_1$ and $L_2$ are each independently H or F,
   the silacyclohexane compound containing at least one trans-1-sila-1,4-cyclohexylene or trans-4-sila-1,4-cyclohexylene group; and (b) a liquid crystal composition comprising one or more compounds selected from the group consisting of the compounds of the general formula (2) to (7)

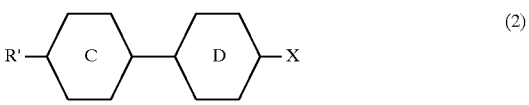

(2)

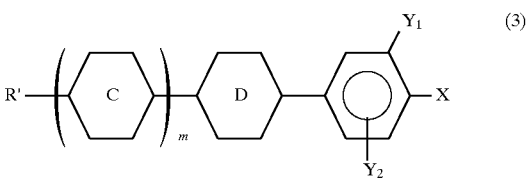

(3)

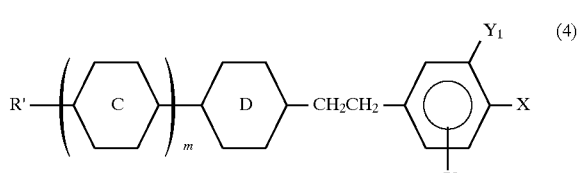

(4)

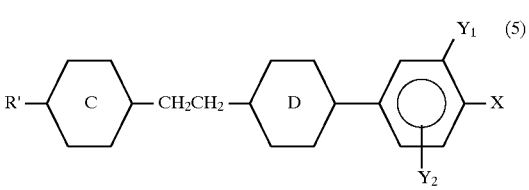

(5)

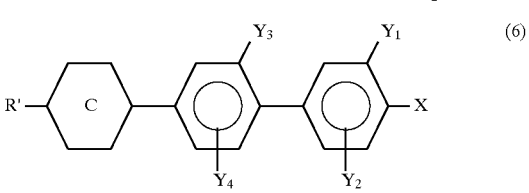

(6)

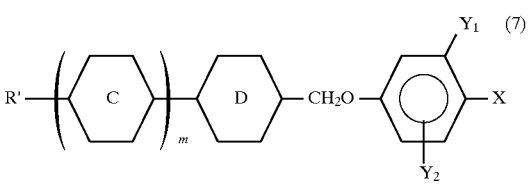

(7)

wherein R' is a $C_{1-7}$ alkyl group, a $C_{2-7}$ alkoxyalkyl group, a $C_{2-7}$ mono- or difluoroalkyl group, or a $C_{2-7}$ alkenyl group, m is 0 or 1,

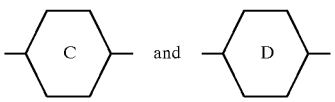

are each independently a trans-1-sila-1,4-cyclohexylene, trans-4-sila-1,4-cyclohexylene or trans-1,4-cyclohexylene group, X is H, CN, F, Cl, $OCHF_2$, $OCF_3$, $CF_3$, $OC_kH_{2k+1}$ (wherein k is an integer of 1 to 5), $C_kH_{2k+1}$, $(O)_sC_pH_qF_r$ (wherein p is 2, 3 or 4, q and r are such integers that (q+r) is equal to (2p+1), and s is 0 or 1) or $(O)_sCY=CX_1X_2$ (wherein $X_1$ and Y are each H, F or Cl, $X_2$ is F or Cl, and s is 0 or 1), and $Y_1$, $Y_2$, $Y_3$ and $Y_4$ are each independently H or F, at least one of the compounds being a compound containing a trans-1-sila-1,4-cyclohexylene or trans-4-sila-1,4-cyclohexylene group.

2. A twisted nematic liquid crystal composition as claimed in claim 1 which further comprises one or more compounds selected from the group consisting of the compounds of the general formula (8), (9), (10) and (11)

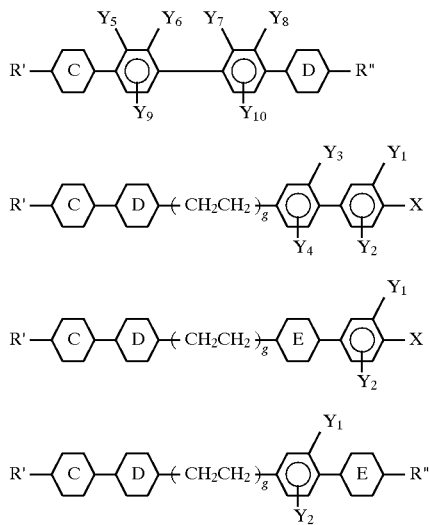

wherein R' and X are as defined in claim 1, g is 0 or 1,

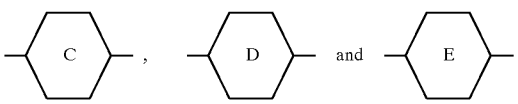

are each independently a trans-1-sila-1,4-cyclohexylene, trans-4-sila-1,4-cyclohexylene or trans-1,4-cyclohexylene group, R" is as defined for R', but is independent of R', and $Y_1$ to $Y_{10}$ are each independently H or F.

3. A guest-host liquid crystal composition comprising a dichromatic dye and, as host liquid crystal, a twisted nematic liquid crystal composition as claimed in claim 1.

4. A guest-host liquid crystal composition comprising a dichromatic dye and, as host liquid crystal, a twisted nematic liquid crystal composition as claimed in claim 2.

5. A liquid crystal display device containing a composition as claimed in claim 1.

6. A liquid crystal display device containing a composition as claimed in claim 2.

7. A liquid crystal display device containing a composition as claimed in claim 3.

8. A liquid crystal display device containing a composition as claimed in claim 4.

* * * * *